US008169796B2

(12) United States Patent
Hosotani

(10) Patent No.: US 8,169,796 B2
(45) Date of Patent: May 1, 2012

(54) ISOLATED SWITCHING POWER SUPPLY APPARATUS

(75) Inventor: Tatsuya Hosotani, Muko (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 13/004,907

(22) Filed: Jan. 12, 2011

(65) Prior Publication Data

US 2011/0103100 A1  May 5, 2011

Related U.S. Application Data

(63) Continuation of application No. PCT/JP2009/058047, filed on Apr. 23, 2009.

(30) Foreign Application Priority Data

Jul. 24, 2008 (JP) ................................ 2008-191174

(51) Int. Cl.
H02M 3/335 (2006.01)

(52) U.S. Cl. .......................................... 363/17; 363/97

(58) Field of Classification Search .............. 363/16–20, 363/21.01, 40, 44, 55, 97, 98, 132; 323/250, 323/251, 255, 358, 361
See application file for complete search history.

(56) References Cited

U.S. PATENT DOCUMENTS

| 4,975,821 | A | * | 12/1990 | Lethellier | 363/21.02 |
|---|---|---|---|---|---|
| 5,126,931 | A | * | 6/1992 | Jitaru | 363/21.04 |
| 6,061,254 | A | * | 5/2000 | Takegami | 363/21.08 |
| 6,304,460 | B1 | | 10/2001 | Cuk | |
| 6,314,002 | B1 | | 11/2001 | Qian et al. | |
| 6,469,913 | B2 | * | 10/2002 | Hosotani et al. | 363/16 |
| 6,956,748 | B2 | * | 10/2005 | Nakagawa | 363/16 |
| 6,995,987 | B2 | * | 2/2006 | Song et al. | 363/17 |
| 7,414,864 | B2 | | 8/2008 | Hosotani et al. | |
| 2001/0024373 | A1 | | 9/2001 | Cuk | |
| 2002/0101742 | A1 | | 8/2002 | Hosotani et al. | |
| 2006/0062024 | A1 | | 3/2006 | Hosotani et al. | |

FOREIGN PATENT DOCUMENTS

| JP | 06-036390 U | 5/1994 |
|---|---|---|
| JP | 07-327366 A | 12/1995 |
| JP | 2001-218457 A | 8/2001 |
| JP | 2002-112544 A | 4/2002 |

(Continued)

OTHER PUBLICATIONS

Official Communication issued in International Patent Application No. PCT/JP2009/058047, mailed on Aug. 4, 2009.

*Primary Examiner* — Rajnikant Patel

(74) *Attorney, Agent, or Firm* — Keating & Bennett, LLP

(57) ABSTRACT

In an isolated switching power supply apparatus, by performing on/off control of a first switching device and a second switching device, energy is transmitted from the primary side to the secondary side using a second primary winding and a second secondary winding while the first switching device is on, and energy is transmitted by a first primary winding and a first secondary winding while the second switching device is on. The first secondary winding and the second secondary winding are connected in series with one another, and an inductor is inserted in series to the second secondary winding. An output current is made to flow through the inductor irrespective of whether the first switching device is on or the second switching device is on.

22 Claims, 23 Drawing Sheets

FOREIGN PATENT DOCUMENTS

| | | |
|---|---|---|
| JP | 2003-102175 A | 4/2003 |
| JP | 2003-533163 A | 11/2003 |
| JP | 2004-514396 A | 5/2004 |
| JP | 2005-051994 A | 2/2005 |
| JP | 2005-160299 A | 6/2005 |
| JP | 2007-043858 A | 2/2007 |
| JP | 2008-113548 A | 5/2008 |
| WO | 2004/019472 A1 | 3/2004 |

* cited by examiner

ISOLATED SWITCHING POWER SUPPLY APPARATUS

BACKGROUND OF THE INVENTION

1. Field of the Invention

The present invention relates to an isolated switching power supply apparatus in which there is substantially no period during which energy transmission between the primary side and secondary side of a transformer is not performed.

2. Description of the Related Art

To date, known examples of general isolated switching power supply apparatuses include forward converters and flyback converters. All of these isolated switching power supply apparatuses store energy in a transformer or an inductor while the main switching device is on, and thereby transmit energy from the primary side to the secondary side while the primary side main switch is either on or off. Hence, there exists a period during which energy is not transmitted from the primary side to the secondary side while the main switch is either off or on.

A known example of an isolated switching power supply apparatus in which energy is transmitted from the primary side to the secondary side during both the on period and off period of the primary side main switching device is a two-transformer DC-DC converter having two transformers. An example thereof is disclosed in Japanese Unexamined Patent Application Publication No. 2005-51994 described below.

Referring to FIG. 1, as the primary side circuit of Japanese Unexamined Patent Application Publication No. 2005-51994, a series circuit constituted by a primary coil W1 of a transformer T1, a primary coil W4 of a transformer T2, and a main switch Q1 is connected to an input DC power source 2 at connection nodes 10 and 20.

A series circuit constituted by a primary coil W5 of the transformer T2, a primary coil W2 of the transformer T1, and a capacitor C1 is connected between the connection node of the primary coil W4 of the transformer T2 and the main switch Q1 and the connection node 20 of the minus terminal of the input DC power source 2 and the main switch Q1.

Further, a series circuit constituted by the capacitor C2 and a sub switching device Q2 is connected between the connection node of the primary coil W4 of the transformer T2 and the main switching device Q1 and the connection node of the primary coil W2 of the transformer T1 and a capacitor C1.

As the secondary side circuit, a series circuit constituted by a secondary coil W3 of the transformer T1 and an output switch Q4 and a series circuit constituted by an output switch Q3 and a secondary coil W6 of the transformer T2 are connected in parallel between the two ends of a load system 3. The output switches Q3 and Q4 function as synchronous rectifier devices, whereby a center-tap full-wave rectifier circuit is formed. A capacitor C3 is connected between the two ends of the load system 3 as a smoothing capacitor.

In this manner, the sub switching device Q2 is off while the main switching device Q1 is on, and on the primary side, a current flows through the primary coil W1 of the transformer T1 and the primary coil W4 of the transformer T2. On the secondary side, the output switch Q3 is on and the output switch Q4 is off; a current flows through the secondary coil W6 of the transformer T2; and an output voltage is applied to the load system 3.

The sub switching device Q2 is on while the main switching device Q1 is off, and on the primary side, a current flows through the primary coil W2 of the transformer T1 and the primary coil W5 of the transformer T2. On the secondary side, the output switch Q3 is off and the output switch Q4 is on; a current flows through the secondary coil W3 of the transformer T1; and an output voltage is applied to the load system 3.

However, the isolated switching power supply apparatus disclosed in Japanese Unexamined Patent Application Publication No. 2005-51994 is characterized in that a choke coil is not required as a result of two transformers having been provided, and hence, has a problem in that two transformers are needed, resulting in an increased size of the circuit.

In addition, although the advantage of no choke coil is necessary for allowing energy to be transmitted from the primary side to the secondary side both when the main switch Q1 is on and off is effective, there is a problem in that no choke coil on the secondary side causes an output ripple to increase due to switching noise generated during the on/off switching period of the main switching device Q1 on the primary side, resulting in an increased size of the smoothing capacitor C3.

Further, since a voltage which is the sum of an input voltage Vin and a voltage across the capacitor C2 is applied between the drain and source of the main switching device Q1, a high-voltage switching device is required. A high-voltage switching device has a large on resistance, which is a resistance component during conduction, and hence, conduction loss in the switching device increases. This results in a decrease in efficiency and an increase in cost.

SUMMARY OF THE INVENTION

Preferred embodiments of the present invention solve the above-described problems and provide an isolated switching power supply apparatus which allows energy to be transmitted from the primary side to the secondary side of a transformer irrespective of the on/off periods of a switching device, which can suppress generation of switching noise that is generated during on/off switching periods and reduce an output ripple, and which allows a low-voltage switching device to be used.

An isolated switching power supply apparatus according to a preferred embodiment of the present invention includes a DC power input portion to which a DC input voltage is input; a transformer including a first primary winding, a first secondary winding, and a second secondary winding magnetically coupled with one another; a first inductor connected in series to the first primary winding; a rectifier circuit including a first rectifier device arranged to rectify a sum of a current generated in the first secondary winding and a current generated in the second secondary winding and a second rectifier device arranged to rectify a current generated in the second secondary winding; a first switch circuit including a first switching device, a first capacitor, and a first diode, that are connected in parallel with one another; a second switch circuit including a second switching device, a second capacitor, and a second diode, that are connected in parallel with one another; a third capacitor; a first series circuit that is connected to both terminals of the DC power input portion and in which the first primary winding or the second primary winding, and the first switch circuit are connected in series with one another; and a second series circuit that is connected to both ends of the first switch circuit, both ends of the first primary winding, or both ends of the second primary winding and in which the second switch circuit and the third capacitor are connected in series with one another; wherein the first switch circuit and the second switch circuit are arranged to complementarily and repeatedly enter on/off states with a period therebetween in which both are in off states, windings of the transformer are arranged such that energy is transmitted from a primary side to a secondary side complementarily by the first secondary winding or the second secondary winding in synchronization with complementary on/off operations of the first switch circuit and the second switch circuit, magnetic polarities of the first secondary winding and the second secondary winding are opposite to each other, and an output voltage is output to the secondary side via the second inductor.

An isolated switching power supply apparatus according to another preferred embodiment of the present invention includes a DC power input portion to which a DC input voltage is input; a transformer including a first primary winding, a first secondary winding, a second primary winding, and a second secondary winding magnetically coupled with one another; a first inductor connected in series to the first primary winding; a third inductor connected in series to the second primary winding; a second inductor connected in series to the first secondary winding; a rectifier circuit including a first rectifier device arranged to rectify a sum of a current generated in the first secondary winding and a current generated in the second secondary winding and a second rectifier device arranged to rectify a current generated in the second secondary winding; a first switch circuit including a first switching device, a first capacitor, and a first diode, that are connected in parallel with one another; a second switch circuit including a second switching device, a second capacitor, and a second diode, that are connected in parallel with one another; a third capacitor; a first series circuit that is connected to both terminals of the DC power input portion and in which the first primary winding or the second primary winding, and the first switch circuit are connected in series with one another; a second series circuit that is connected to both ends of the first switch circuit, both ends of the first primary winding, or both ends of the second primary winding and in which the second switch circuit and the third capacitor are connected in series with one another; and a fourth capacitor connected in parallel with the first series circuit; wherein the first switch circuit and the second switch circuit are arranged to complementarily and repeatedly enter on/off states with a period therebetween in which both are in off states, windings of the transformer are arranged such that energy is transmitted from a primary side to a secondary side complementarily by the first secondary winding or the second secondary winding in synchronization with complementary on/off operations of the first switch circuit and the second switch circuit; wherein magnetic polarities of the first secondary winding and the second secondary winding are opposite to each other, and an output voltage is output to the secondary side via the second inductor.

The transformer preferably includes a first transformer including the first primary winding and the first secondary winding and a second transformer including the second primary winding and the second secondary winding.

Primary side magnetic flux leakage of the transformer is preferably used as the first inductor.

Secondary side magnetic flux leakage of the transformer is preferably used as the second inductor.

Primary side magnetic flux leakage of the transformer is preferably used as the third inductor.

In the transformer, the first primary winding or the second primary winding preferably is wound in a direction such that DC magnetic flux generated in a common magnetic core due to a current flowing through the second secondary winding is cancelled out and the first secondary winding preferably has a magnetic polarity opposite to the polarity of the second secondary winding and has a greater number of turns than the second secondary winding.

A direction of a current that flows when the first switch circuit or the second switch circuit is in a conductive state, the first primary winding and the second primary winding preferably have the same magnetic polarity and the first secondary winding and the second secondary winding preferably have opposite magnetic polarities.

The transformer preferably has a weaker magnetic coupling strength than the second transformer.

The first switch circuit and the second switch circuit preferably are field effect transistors, for example.

The first switch circuit or the second switch circuit is preferably driven so as to perform a zero voltage switching operation in which a switching device is turned on after a voltage across both ends of the switch circuit has decreased to or approximately to 0 V.

The rectifier circuit preferably includes a third diode that is arranged to rectify a current flowing through the first secondary winding during a period in which the energy is transmitted from the primary side to the secondary side by the first secondary winding, and a fourth diode that is arranged to rectify a current flowing through the second secondary winding during a period in which the energy is transmitted from the primary side to the secondary side by the second secondary winding.

A synchronous rectifier configuration is preferably used in which the third diode or the fourth diode is replaced by a field effect transistor, for example.

A ratio of a number of turns of the first secondary winding to a number of turns of the second secondary winding preferably is 2:1.

In the transformer, at least a magnetic coupling between the second secondary winding and the first secondary winding preferably is relatively large and a magnetic coupling between the first primary winding and each of the other windings is relatively small.

A layered winding arrangement is preferably used in the first primary winding and the first secondary winding and a split winding arrangement is preferably used for at least either the first secondary winding and the second secondary winding or the first primary winding and the second secondary winding.

The transformer preferably includes a plurality of core legs, the first primary winding and the first secondary winding are wound around the same core leg, and at least the second secondary winding is wound around another core leg.

A layered winding arrangement is preferably used for the first primary winding and the first secondary winding and a split winding arrangement is preferably used for at least either the first secondary winding and the second secondary winding or the first primary winding and the second secondary winding.

The first switch circuit and the second switch circuit are preferably controlled to make the output voltage stable using PWM control.

The third capacitor is preferably connected between the first primary winding and the first switch circuit.

One of the first switch circuit and the second switch circuit preferably is only driven in a range $0 \leqq Da \leqq 0.5$, where Da is a ratio equal to on time/switching cycle thereof, and the other is only driven in a range $0.5 \leqq Da \leqq 1$.

By letting a voltage conversion ratio which is represented by a ratio of the output voltage Vo to an input voltage Vi of the DC power input portion be M (which is equal to Vo/Vi), and a ratio of a number of turns of the first primary winding np to a number of turns of the first secondary winding ns be n (which is equal to np/ns), $M=D(1-D)/n$.

According to a preferred embodiment of the present invention, energy can be transmitted from the primary side to the secondary side irrespective of whether a switching device is in an on period or in an off period, resulting in increased power conversion efficiency.

According to a preferred embodiment of the present invention, by using a single composite transformer defined by a magnetic flux leakage transformer, all the inductance devices necessary for the circuit operation can be replaced by magnetic flux leakage, whereby a considerable reduction in the scale of entire circuit is realized.

According to a preferred embodiment of the present invention, since energy is not stored in an inductance device during the transmission of energy from the primary side to the secondary side, a reduction in the size of the transformer is possible.

According to a preferred embodiment of the present invention, since the maximum magnetic flux density can be sufficiently reduced even for a heavy load, a transformer can be designed with a margin against magnetic saturation and the like, compared with existing ones, resulting in a reduction in the size and weight of the transformer.

According to a preferred embodiment of the present invention, since filter inductors are provided on the primary side and the secondary side to suppress fluctuations of a current at the time when an energy transmission path is switched from one magnetic coupling between the primary winding and the secondary winding to the other magnetic coupling between the primary winding and the secondary winding, output ripple noise can be reduced and a smoothing capacitor can be reduced in size.

According to a preferred embodiment of the present invention, since the inductor on the output side is replaced by magnetic flux leakage, the number of components can be decreased and the scale of circuits can be considerably reduced.

According to a preferred embodiment of the present invention, since the operation voltage of the first switching device can be lowered to a voltage which is the same as an input voltage, a low-voltage semiconductor component can be used as the switching device, and since the on resistance thereof is low, switching loss is expected to be lowered, whereby low cost and high efficiency are realized.

According to a preferred embodiment of the present invention, by driving the first switching device and the second switching device on a zero voltage switching basis, the switching loss can be further decreased, whereby high efficiency is realized.

According to a preferred embodiment of the present invention, by replacing an inductance device necessary for zero voltage switching driving with magnetic flux leakage of the transformer, the number of components can be decreased, whereby a considerable reduction in size is realized.

According to a preferred embodiment of the present invention, since the switching device functions as a voltage clamp circuit, a switching surge voltage is prevented from being applied to the switching device. Hence, a low-voltage semiconductor component can be used as the switching device, and through the use of a low-resistance device, conduction loss is lowered, whereby high efficiency is realized.

According to a preferred embodiment of the present invention, a high efficiency isolated switching power supply apparatus having the above-described advantages with a simplified circuit can be realized.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1:
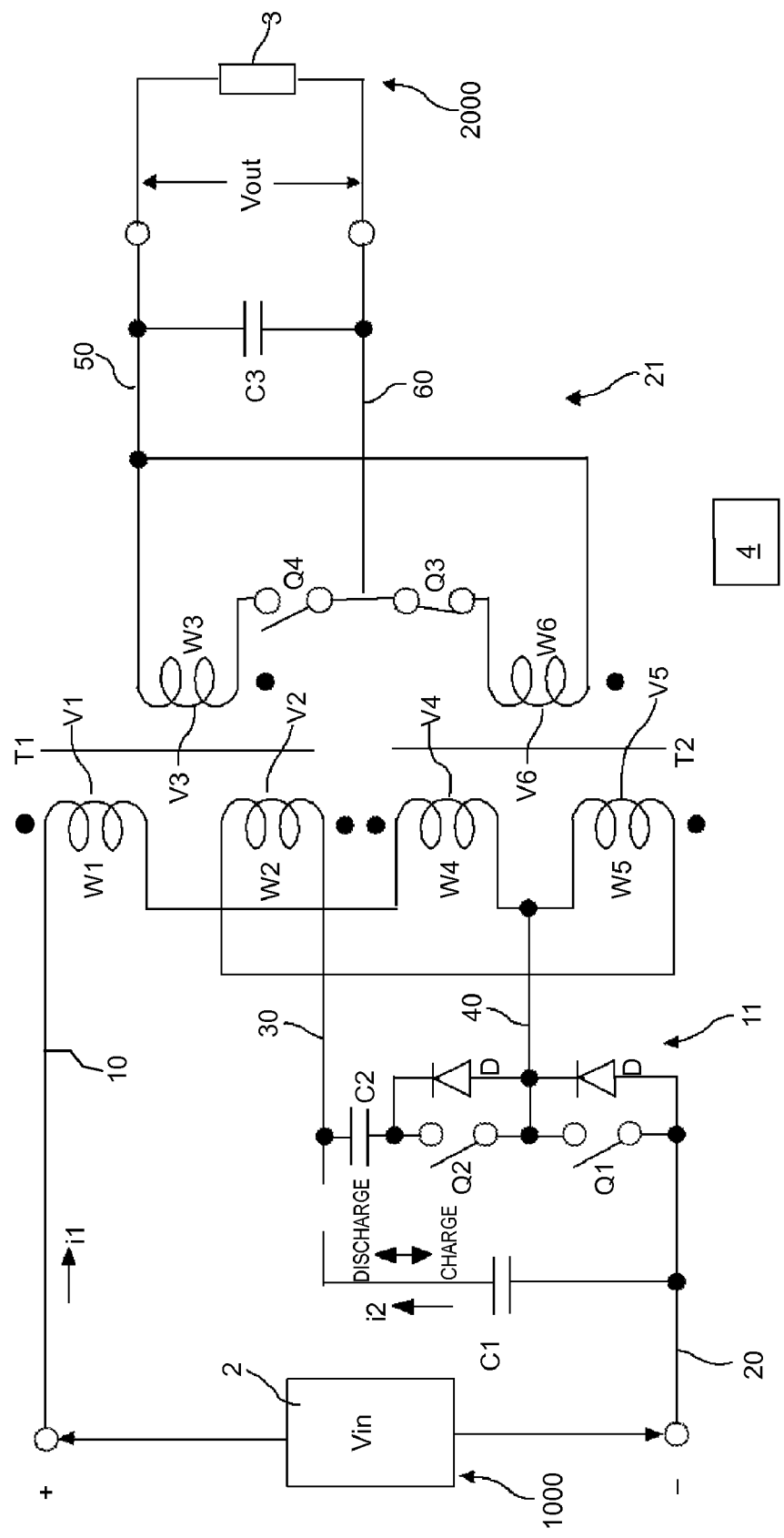
FIG. 1 is a circuit diagram of the isolated switching power supply apparatus illustrated in Japanese Unexamined Patent Application Publication No. 2005-51994.
Figure 2:
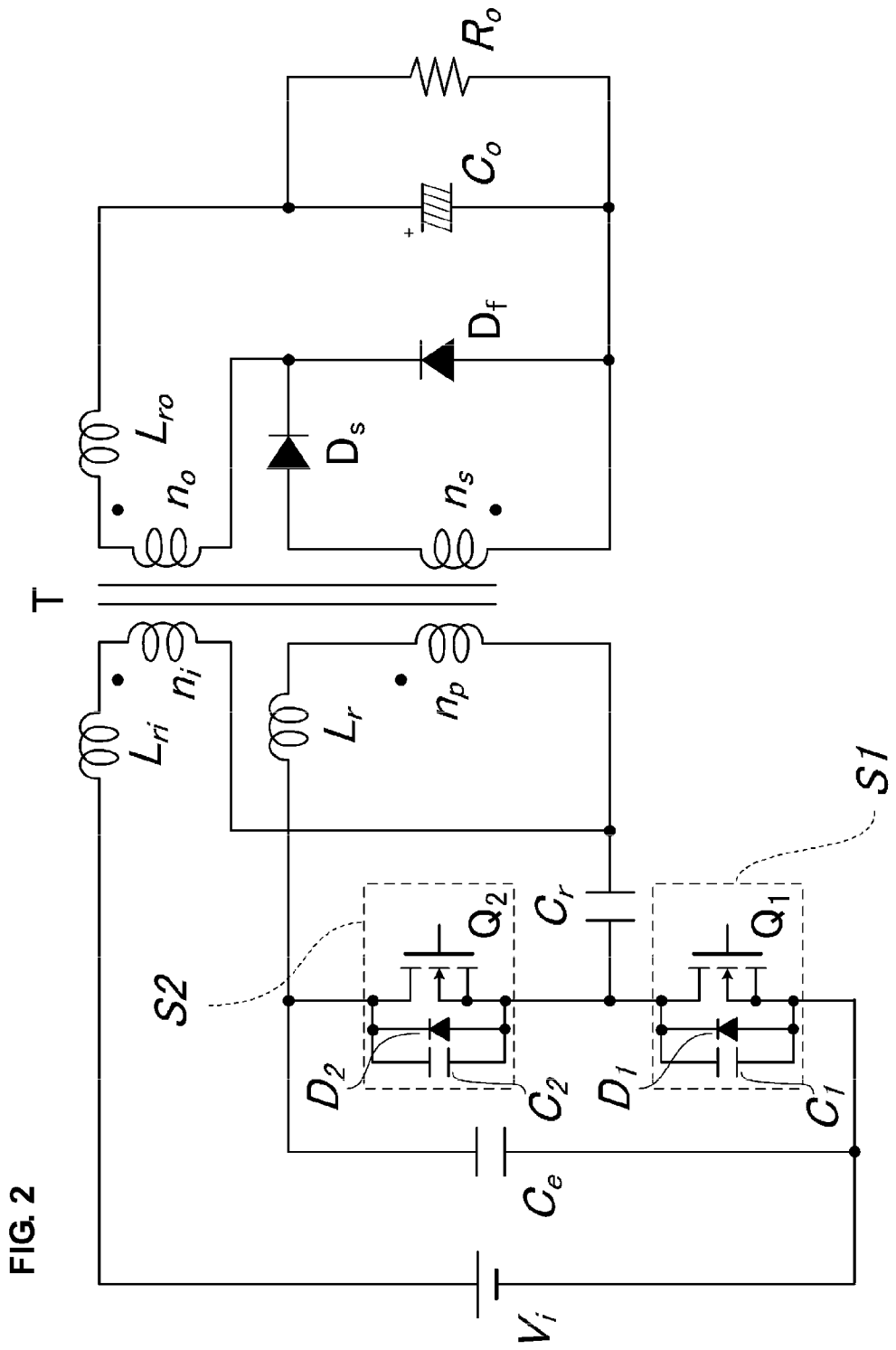
FIG. 2 is a circuit diagram of an isolated switching power supply apparatus according to a first preferred embodiment of the present invention.

FIG. 2 is a circuit diagram of an isolated switching power supply apparatus according to a first preferred embodiment of the present invention.

Referring to FIG. 2, in this isolated switching power supply apparatus, a series circuit including a first inductor Lri, a second primary winding ni of a composite transformer T, a third capacitor Cr, and a first switch circuit S1 is connected between the + terminal and the − terminal of a power input portion to which a DC voltage V1 is applied. A series circuit including a first primary winding np of the composite transformer T, a second inductor Lr, and a fourth capacitor Ce is connected between the connection node of the second primary winding ni of the composite transformer T and the third capacitor Cr and the − terminal of the power input portion. A second switch circuit S2 is connected between the connection node of the third capacitor Cr and the first switch circuit S1 and the connection node of the second inductor Lr and the fourth capacitor Ce.

Note that, since a short circuit is generated when the first switch circuit S1 and the second switch circuit S2 are turned on at the same time, they are arranged to operate so as to be on/off in a complimentary manner with each other with a minimum necessary dead time between on and off.

The first switch circuit S1 includes a first switching device Q1, a first diode D1, and a first capacitor C1, connected in parallel with one another. The second switch circuit S2 includes a second switching device Q2, a second diode D2, and a second capacitor C2, connected in parallel with one another.

When the first switching device Q1 and the second switching device Q2 include field effect transistors such as MOS-FETs, the parasitic diodes thereof may be used as the first diode D1 and the second diode D2, and the parasitic capacitors thereof may be used as the first capacitor C1 and the second capacitor C2. This allows these individual components to be omitted and a reduction in the number of components to be realized.

The secondary side of the composite transformer T is provided with a first secondary winding ns, which is mainly coupled with the first primary winding, and a second secondary winding no, which is mainly coupled with the second primary winding ni. The first primary winding np and the second primary winding ns are wound so as to have opposite polarities, and the second primary winding ni and the second secondary winding no are wound so as to have the same polarity.

One end of the first secondary winding ns of the composite transformer T is connected to the anode of a third diode Ds, the other end of the first secondary winding ns is connected to the anode of a fourth diode Df, and the cathode of the fourth diode Df is connected to the cathode of the third diode Ds. One end of the second secondary winding no is connected to the connection node of the cathode of the third diode Ds and the cathode of the fourth diode Df, and the other end of the second secondary winding no is connected to one end of a third inductor Lro. The other end of the third inductor Lro is connected to one end of a load Ro, and the other end of the load Ro is connected to the other end of the first secondary winding ns. A fifth capacitor Co used for smoothing is connected, in parallel, between the two ends of the load Ro.

By using this configuration, the polarities of the first primary winding np and the first secondary winding ns of the composite transformer T are set so as to realize a flyback system that outputs power during a period in which the first switching device Q1 is off and the second switching device Q2 is on. The polarities of the second primary winding ni and the second secondary winding no are set so as to realize a forward system that outputs power during a period in which the first switching device Q1 is on and the second switching device Q2 is off. Hence, during a period in which the first switching device Q1 is on and the second switching device Q2 is off, a voltage is induced in the second secondary winding no, whereby the fourth diode Df is turned on and an output current is made to flow through the third inductor Lro and a DC output voltage is applied to the load Ro.

During a period in which the first switching device Q1 is off and the second switching device Q2 is on, a voltage is induced in the first secondary winding ns, whereby the third diode Ds is turned on and an output current is made to flow through the third inductor Lro and a DC output voltage is applied to the load Ro.

In this manner, the composite transformer T allows energy to be transmitted from the primary side to the secondary side irrespective of whether the first switch circuit S1 is in an on period or in an off period. Hence, except for a minimum dead time, energy can be transmitted from the primary side to the secondary side substantially over the whole of the switching period. Further, during a dead time period, which is a short period during which transmission paths are switched, the filter inductor Lro defined by magnetic flux leakage of the transformer allows fluctuations in current to be suppressed and hence output ripple noise to be significantly decreased, resulting in a reduction in the size of the fifth capacitor Co used for smoothing.

Figure 18:
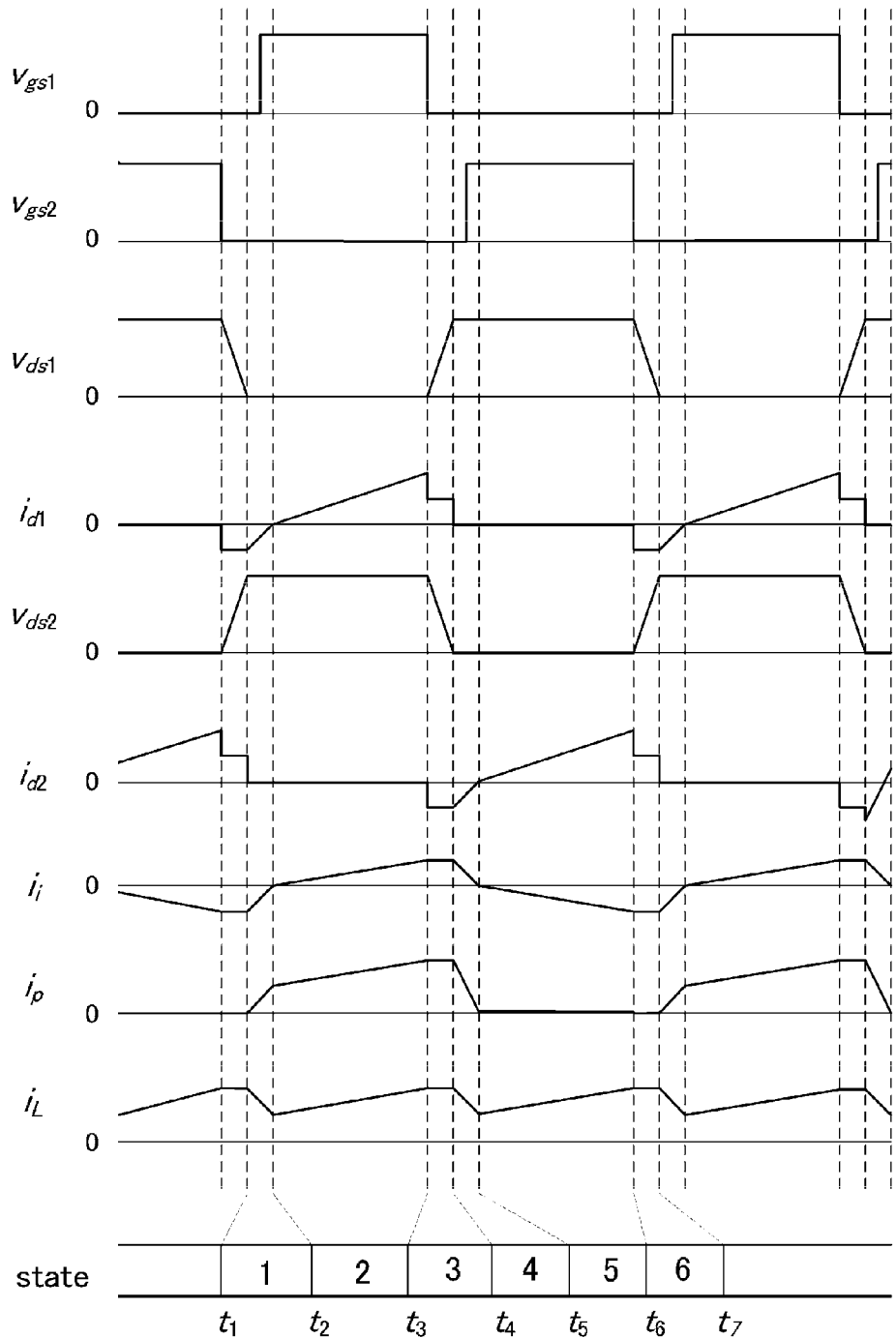
FIG. 18 is a waveform diagram of an isolated switching power supply apparatus according to the first preferred embodiment of the present invention.

FIG. 18 is a waveform diagram of the various portions of the circuits in the isolated switching power supply apparatus illustrated in FIG. 2. Hereinafter, the circuit operations are described with reference to FIGS. 2 and 12. Referring to FIG. 18, vgs1 and vgs2 respectively are the voltages between the gates and sources of the switching devices Q1 and Q2, substantially showing respective on/off waveforms of the switching devices Q1 and Q2, and vds1 and vds2 respectively are the voltages between the drains and sources of the switching devices Q1 and Q2, substantially showing respective voltage waveforms across the capacitors C1 and C2. Further, id1, id2, ii, ip, and iL respectively are the current waveforms of currents flowing through the switch circuits S1 and S2, the second primary winding ni, the first primary winding np, and the third inductor Lro.

For a rated operation of this isolated switching power supply apparatus, the operation can be divided into six states across times t1 to t7 in one switching cycle Ts. Hereinafter, the circuit operation is described separately for each of the states.

(1) State 1 [t1~t2]

First, after the second switching device Q2 has been turned off, when a drain-source voltage Vds1 of the first switching device Q1 approaches approximately zero volts, the first diode D1 is turned on. At this timing, the first switching device Q1 is turned on and a zero voltage switching (ZVS) operation is performed.

(2) State 2 [t2~t3]

As a result of the first switching device Q1 being turned on, a current flows through the first primary winding np and the second primary winding ni, and the current id1 flowing through the first switching device Q1 and the current ip flowing through the first primary winding np increase linearly. At this time, the first secondary winding ns which is mainly magnetically coupled with the first primary winding np operates as a flyback converter, and the second secondary winding no which is mainly magnetically coupled with the second primary winding ni operates as a forward converter. Hence, on the secondary side of the composite transformer T, a current flows only through the second secondary winding no, and consequently, the third diode Ds is turned off, and the fourth diode Df is turned on. Hence, the current that flows on the secondary side of the composite transformer T flows sequentially through the fourth diode Df→the first secondary winding no→the third inductor Lro→the load Ro.

(3) State 3 [t3~t4]

When the first switching device Q1 is turned off, the first capacitor C1 is charged with energy stored in the first inductor Lri and the second inductor Lr, and the drain-source voltage Vds1 of the first switching device Q1 increases accordingly. At the same time, the second capacitor C2 is discharged and the drain-source voltage Vds2 of the second switching device Q2 decreases accordingly.

(4) State 4 [t4~t5]

When the drain-source voltage Vds2 of the second switching device Q2 approaches approximately zero volts, the second diode D2 is turned on. At this timing, the second switching device Q2 is turned on and a zero-voltage switching (ZVS) operation is performed.

(5) State 5 [t5~t6]

As a result of the second switching device Q2 being turned on, the first primary winding np and the second primary winding ni are magnetized in a direction opposite to that in the case of State 2, a current does not flow in the first primary winding np, and the current ii flowing in the second primary winding ni increases linearly in a direction opposite to that in the case of State 2. The current id2 flowing through the second switching device Q2 also increases linearly. At this time the first secondary winding ns, which is mainly magnetically coupled with the first primary winding np, operates as a flyback converter, and the second secondary winding no, which is mainly magnetically coupled with the second primary winding ni, operates as a forward converter. Hence, on the secondary side of the composite transformer T, a current flows only through the first secondary winding ns, and consequently, the third diode Ds is turned on, and the fourth diode Df is turned off. Hence, the current that flows on the secondary side of the composite transformer T flows sequentially through the first secondary winding ns→the third diode Ds→the second secondary winding no→the third inductor Lro→the load Ro.

(6) State 6 [t6~t7]

When the second switching device Q2 is turned off, the second capacitor C2 is charged with energy stored in the second inductor Lr, and the drain-source voltage Vds2 of the second switching device Q2 increases accordingly. At the same time the first capacitor C1 is discharged and the drain-source voltage Vds1 of the first switching device Q1 decreases accordingly. After this, the state returns to State 1.

Regarding the on/off timings of the first switching device Q1 and the second switching device Q2, for example, an output voltage detection circuit is provided, and when a voltage exceeds a predetermined level, it is fed back preferably using an isolated feedback device, such as a photo coupler, for example, and thereby on/off control is performed.

When PWM (pulse width modulation) control is preferably used as the on/off control, the switching frequency is fixed, and hence, the frequency components of EMI noise and the like generated together with the switching operation are centered around a fixed frequency, which makes it easy to take measures against the noise.

However, the present invention is not limited to the use of PWM control, and can use any of various control methods, such as PAM (pulse amplitude modulation) control and PFM (pulse frequency modulation) control, and combinations thereof.

Figure 19:
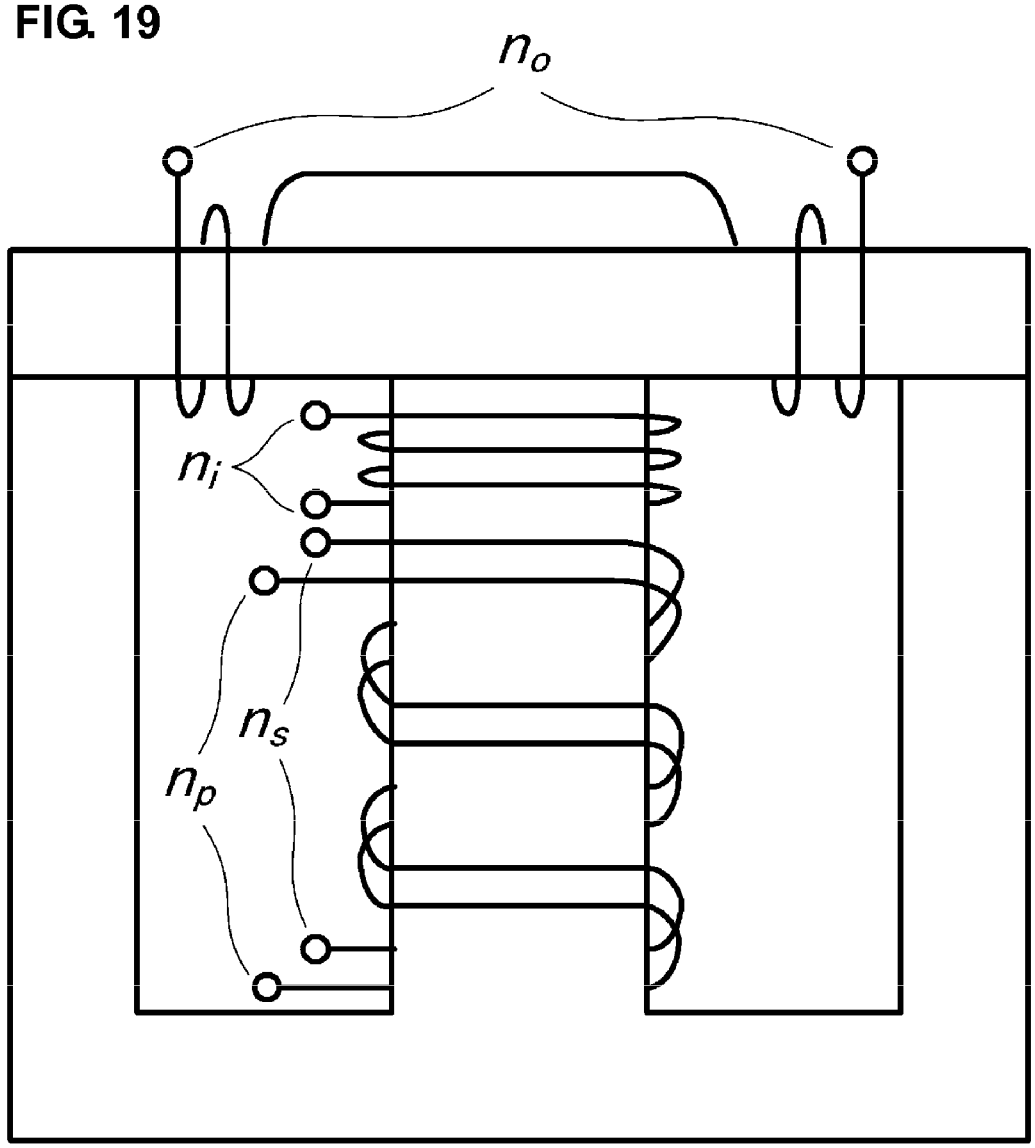
FIG. 19 is an exemplary configuration of a transformer used in the first preferred embodiment of the present invention.
Figure 20:
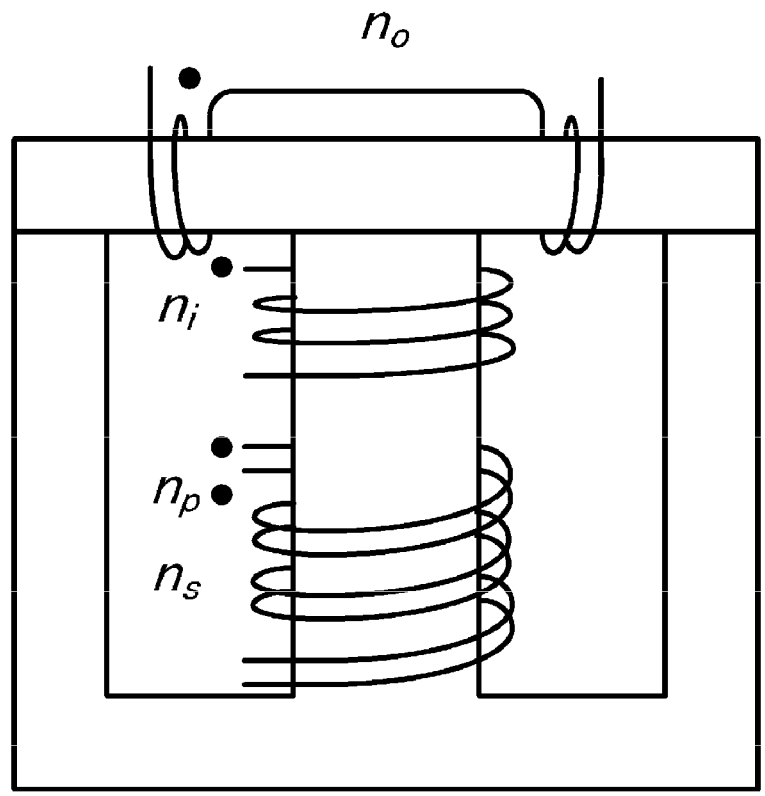
FIG. 20 is another exemplary configuration of the transformer used in the first preferred embodiment of the present invention.

FIG. 19 is an external view of the composite transformer T included in the isolated switching power supply apparatus according to the first preferred embodiment of the present invention.

Figure 9:
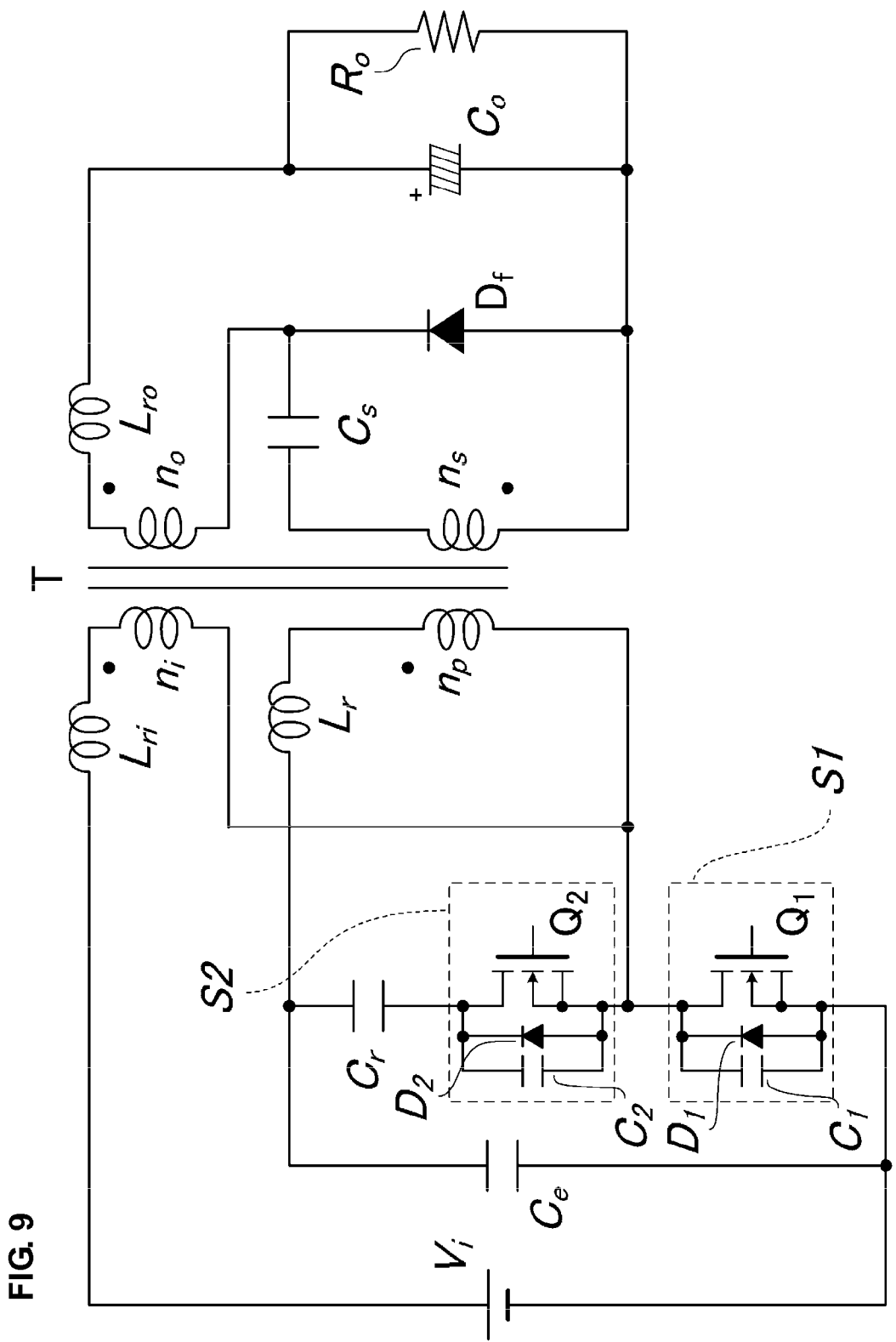
FIG. 9 is a circuit diagram of an isolated switching power supply apparatus according to an eighth preferred embodiment of the present invention.
Figure 21:
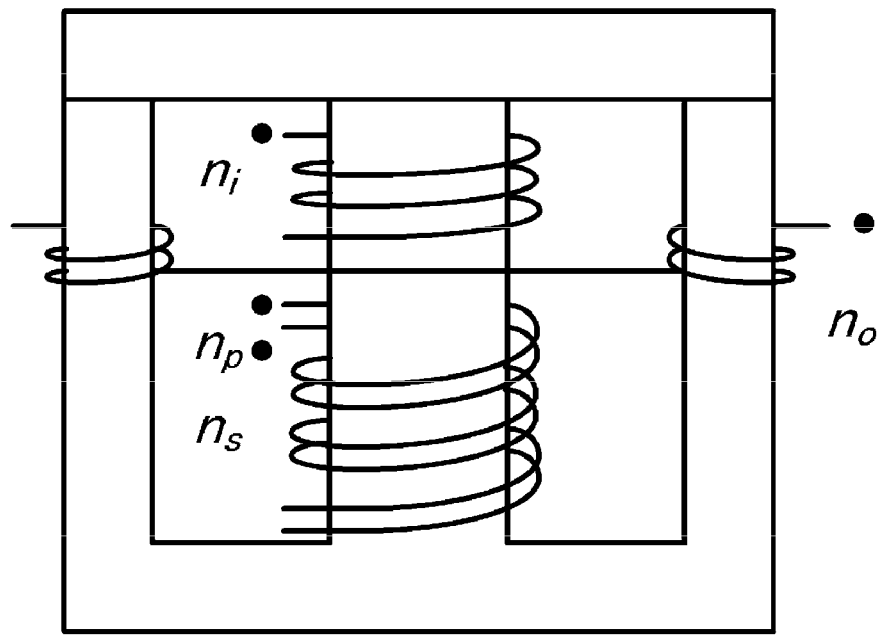
FIG. 21 is another exemplary configuration of the transformer used in the first preferred embodiment of the present invention.
Figure 22:
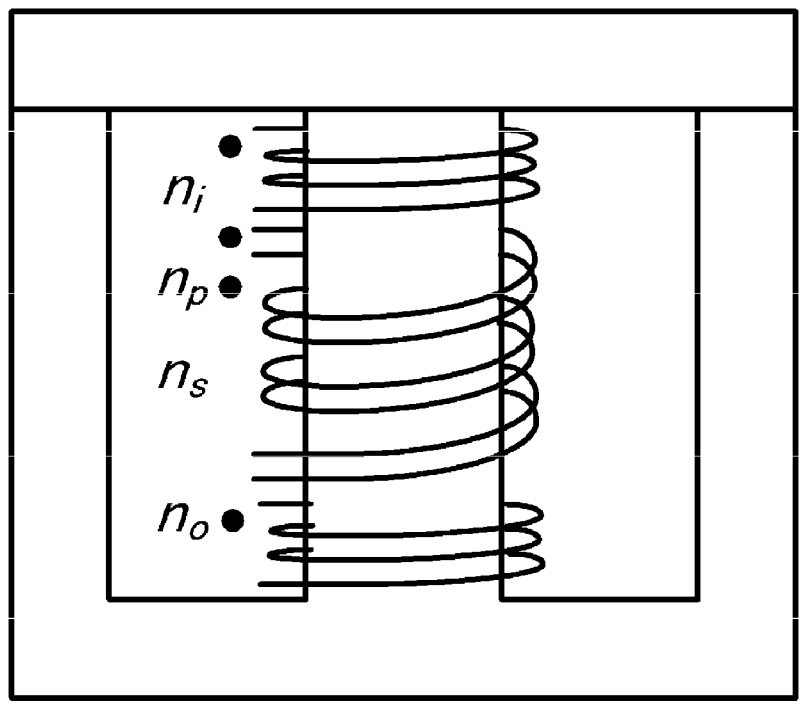
FIG. 22 is another exemplary configuration of the transformer used in the first preferred embodiment of the present invention.
Figure 23:
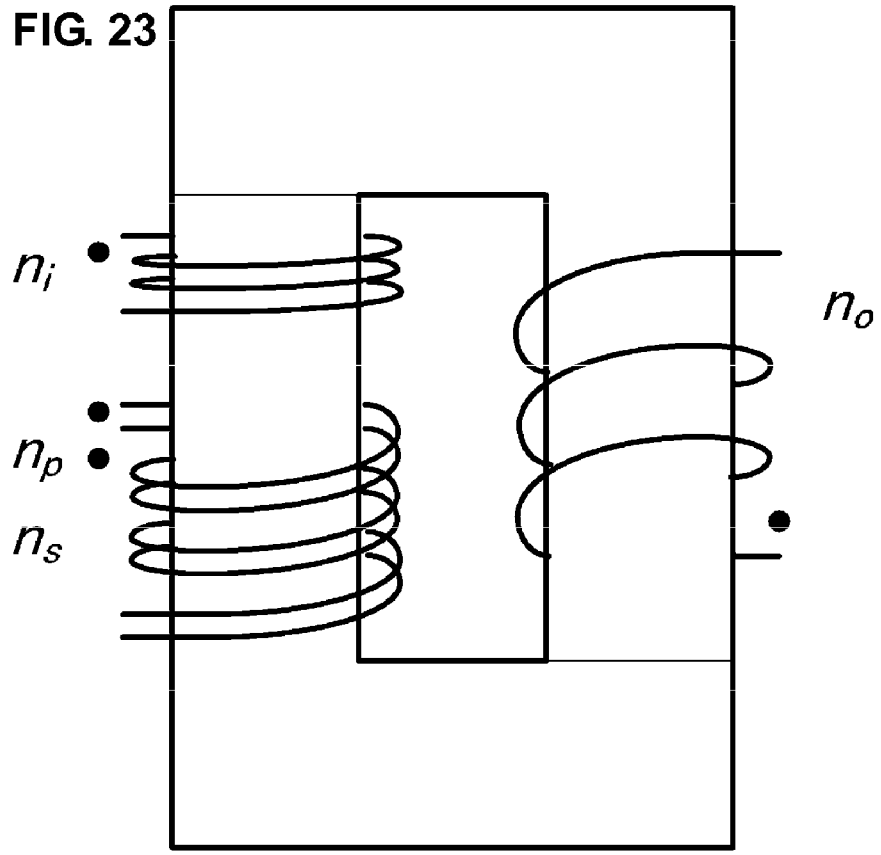
FIG. 23 is another exemplary configuration of the transformer used in the first preferred embodiment of the present invention.
Figure 24:
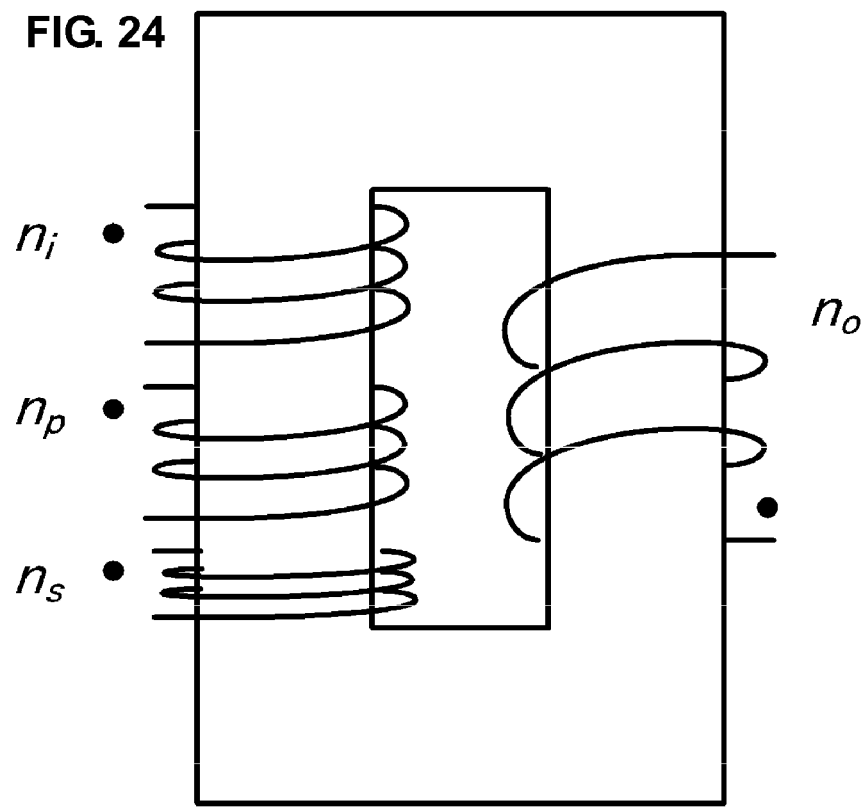
FIG. 24 is another exemplary configuration of the transformer used in the first preferred embodiment of the present invention.
Figure 25:
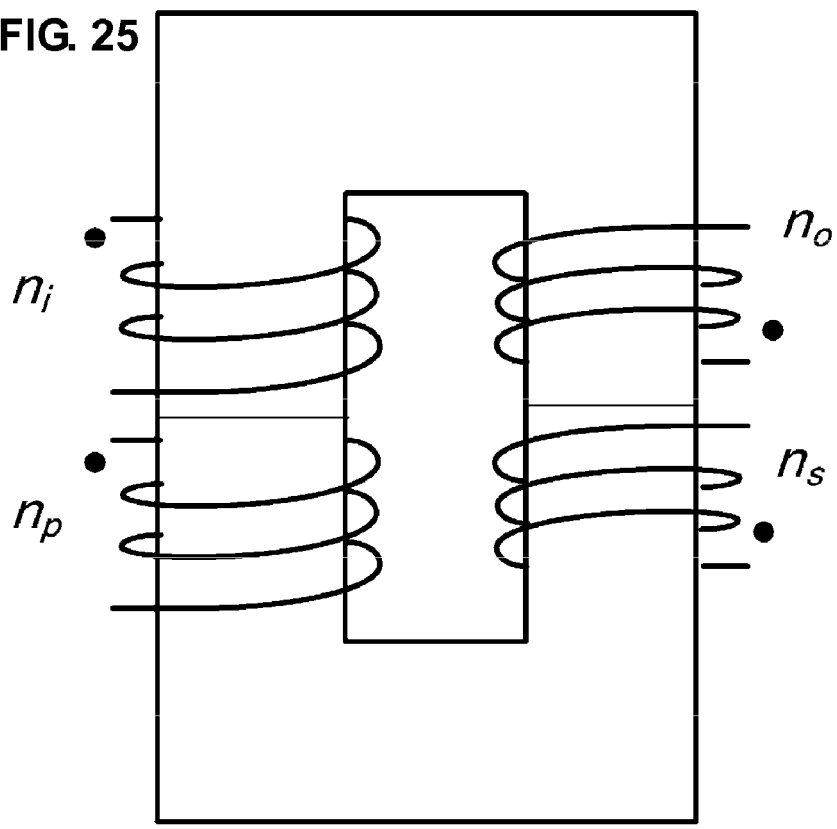
FIG. 25 is another exemplary configuration of the transformer used in the first preferred embodiment of the present invention.
Figure 26:
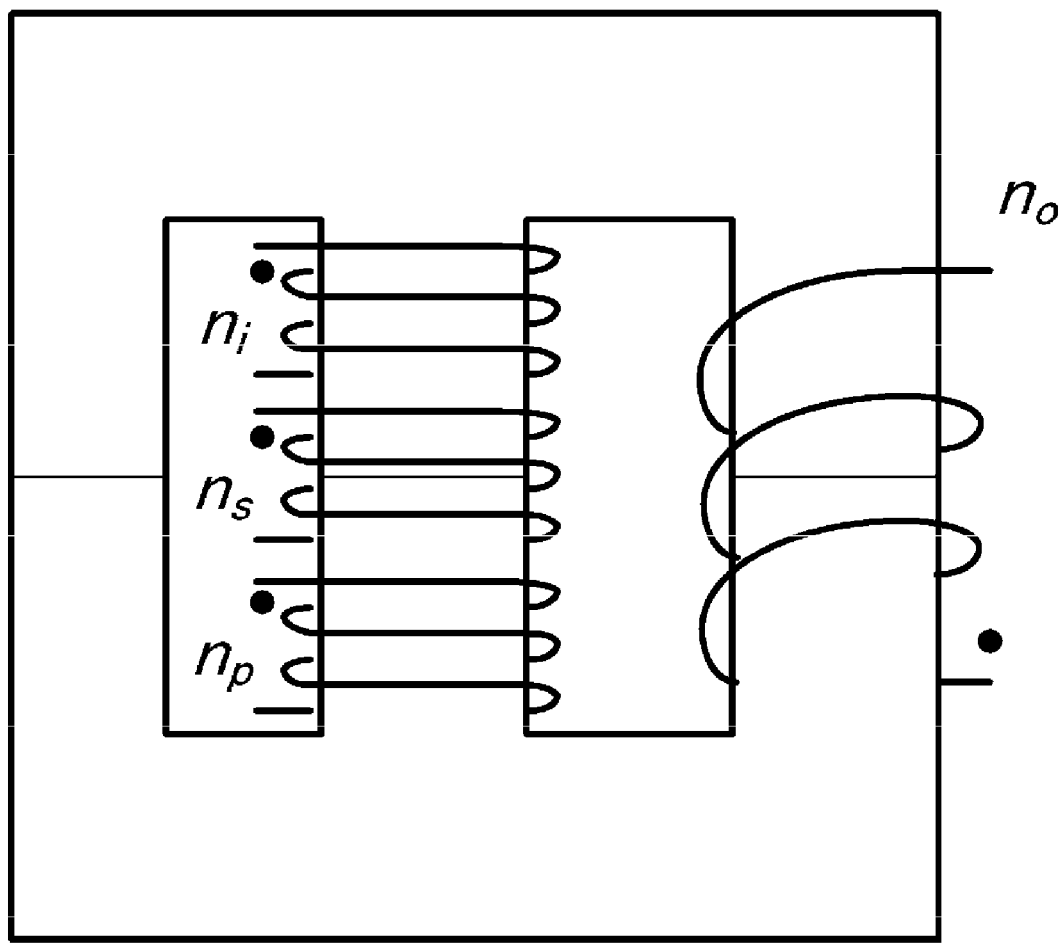
FIG. 26 is another exemplary configuration of the transformer used in the first preferred embodiment of the present invention.

Referring to FIG. 19, the first secondary winding ns which is mainly magnetically coupled with the first primary winding np and the second secondary winding no which is mainly magnetically coupled with the second primary winding ni constitute a single composite transformer. The second secondary winding no is wound such that magnetic coupling with other windings is minimized and magnetic flux leakage is large. More specifically, as illustrated in FIGS. 9 and 21, the composite transformer T includes a plurality of core legs, the first primary winding np and the first secondary winding ns are wound around the same core leg, and at least the second secondary winding no is wound around another core leg. The first primary winding np and the first secondary winding ns preferably use a layered winding arrangement, and the second secondary winding no preferably uses a split winding arrangement, for example. This is a configuration for making an inductance value large when the third inductor Lro is replaced by the magnetic flux leakage of the composite transformer T.

In a single composite transformer T, by letting a voltage induced in the first secondary winding ns be Vo1, a voltage induced in the second secondary winding no be Vo2, and a voltage output to the load Ro be Vo, and assuming that the ratio of the number of turns of the first secondary winding ns to the number of turns of the second secondary winding no is ns:no=2:1, the output voltage Vo is given by:

$$Vo=Vo2$$

when the first switching device Q1 is on and the second switching device Q2 is off. When the first switching device Q1 is off and the second switching device Q2 is on, the output voltage Vo is given by:

$$Vo=Vo1-Vo2-2Vo2-Vo2=Vo2,$$

whereby the ripple component of the output voltage Vo can be removed.

In the case where ns:no=1:1, the magnitude of magnetic flux generated in the core of the composite transformer T when the first switching device Q1 is on and the second switching device Q2 is off is the same as the magnitude of the magnetic flux generated in the core of the composite transformer T when the first switching device Q1 is off and the second switching device Q2 is on, and the core of the transformer is most unlikely to be saturated. Hence, it is possible to design composite transformers with a margin.

A transformer, as illustrated in FIG. 19, provided with a portion where magnetic coupling is small so as to intentionally generate magnetic flux leakage is called a magnetic flux leakage transformer. The structures of such magnetic flux leakage transformers have variations as illustrated in FIGS. 19 to 26. All of them have a configuration in which the second secondary winding no has a small degree of magnetic coupling with the other windings and the first primary winding np and the first secondary winding ns have strong magnetic coupling. Examples of the structures of the cores include an "EE core", an "EI core", an "ER core", an "ERI core", an "LL core", and a "UU core".

Further, in the first preferred embodiment, when the first primary winding np and the second primary winding ni of the composite transformer T are made to have the same number of turns, by letting the duty ratio (=on time/switching cycle time) be Da and the ratio of the number of turns of the first primary winding np to the number of turns of the first secondary winding ns be n, a voltage conversion ratio M (=Vo/Vi) is obtained as described below.

By letting the voltage across the third capacitor Cr be Vcr, the voltage across the fourth capacitor Ce be Vice, the on time of the switching device be Ton, and the off time be Toff, Vi=VCe and D=Ton/(Ton+Toff). Hence the following equation holds:

$$(Vi-Vcr) \times Ton = -(Vi-VCe-VCr) \times Toff$$

This gives:

$$VCr = D \times Vi.$$

At the same time the following equation holds:

$$Vo = \{(no/ni) \times (Vi-VCr) \times D + ((no-ns)/np) \times (-VCr) \times (1-D)\} \times Vi$$

Since ni=np, this equation gives:

$$M = Da \times (1-Da)/n.$$

Hence, since the voltage conversion ratio M describes a parabola with a peak at Da=0.5, the first switching device Q1 and the second switching device Q2 can operate symmetrically with respect to a boundary point of Da=0.5. In other words, one switching device operates in the range:

$$0 \leq Da \leq 0.5,$$

while the other switching device operates in the range:

$$0.5 \leq Da \leq 1.$$

In this manner, the conduction loss of the switching loss can be dispersed, thereby realizing a reduction in the size of a heat radiation structure and the size of an isolated switching power supply apparatus accordingly.

The configuration of the isolated switching power supply apparatus according to the first preferred embodiment has the following advantages.

Energy can be transmitted from the primary side to the secondary side irrespective of whether a switching device is in an on period or in an off period, resulting in increased power conversion efficiency.

By using a single composite transformer preferably defined by a magnetic flux leakage transformer, all the inductance devices necessary for the circuit operation can be replaced by magnetic flux leakage, whereby a considerable reduction in the scale of the entire circuit is realized.

Since energy is not stored in an inductance device in the transmission of energy from the primary side to the secondary side, a reduction in the size of the transformer is possible.

Since the maximum magnetic flux density can be sufficiently reduced even for a heavy load, a transformer can be designed with a margin against magnetic saturation and the like, compared with existing ones, resulting in a reduction in the size and weight of the transformer.

Since filter inductors are provided on the primary side and the secondary side to suppress fluctuations of a current at the time when an energy transmission path is switched from one magnetic coupling between the primary winding ni and the secondary winding no to the other magnetic coupling between the primary winding np and the secondary winding ns, output ripple noise can be reduced and a smoothing capacitor can be reduced in size.

Since the inductor Lro on the output side is replaced by magnetic flux leakage, the number of components can be decreased and the scale of circuits can be considerably reduced.

Since the operation voltage of the first switching device Q1 can be lowered to a voltage which is the same as an input voltage, a low-voltage semiconductor component can be used as the switching device, and since the on resistance thereof is low, switching loss is expected to be lowered, whereby low cost and high efficiency are realized.

By driving the first switching device Q1 and the second switching device Q2 on a zero voltage switching basis, the switching loss can be further decreased, whereby high efficiency is realized.

By replacing an inductance device necessary for zero voltage switching driving with magnetic flux leakage of the transformer, the number of components can be decreased, whereby a considerable reduction in size is realized.

Since the switching device Q2 functions as a voltage clamp circuit, a switching surge voltage is prevented from being applied to the switching device Q1. Hence, a low-voltage semiconductor component can be used as the switching device, and through the use of a low-resistance device, conduction loss is lowered, whereby high efficiency is realized.

Although the first primary winding np and the first secondary winding ns are configured to have opposite polarities and the second primary winding ni and the second secondary winding no are configured to have the same polarity in the first preferred embodiment, the winding may be configured such that the first primary winding np and the first secondary winding ns have the same polarity and the second primary winding ni and the second secondary winding no have opposite polarities.

Second Preferred Embodiment

Figure 3:
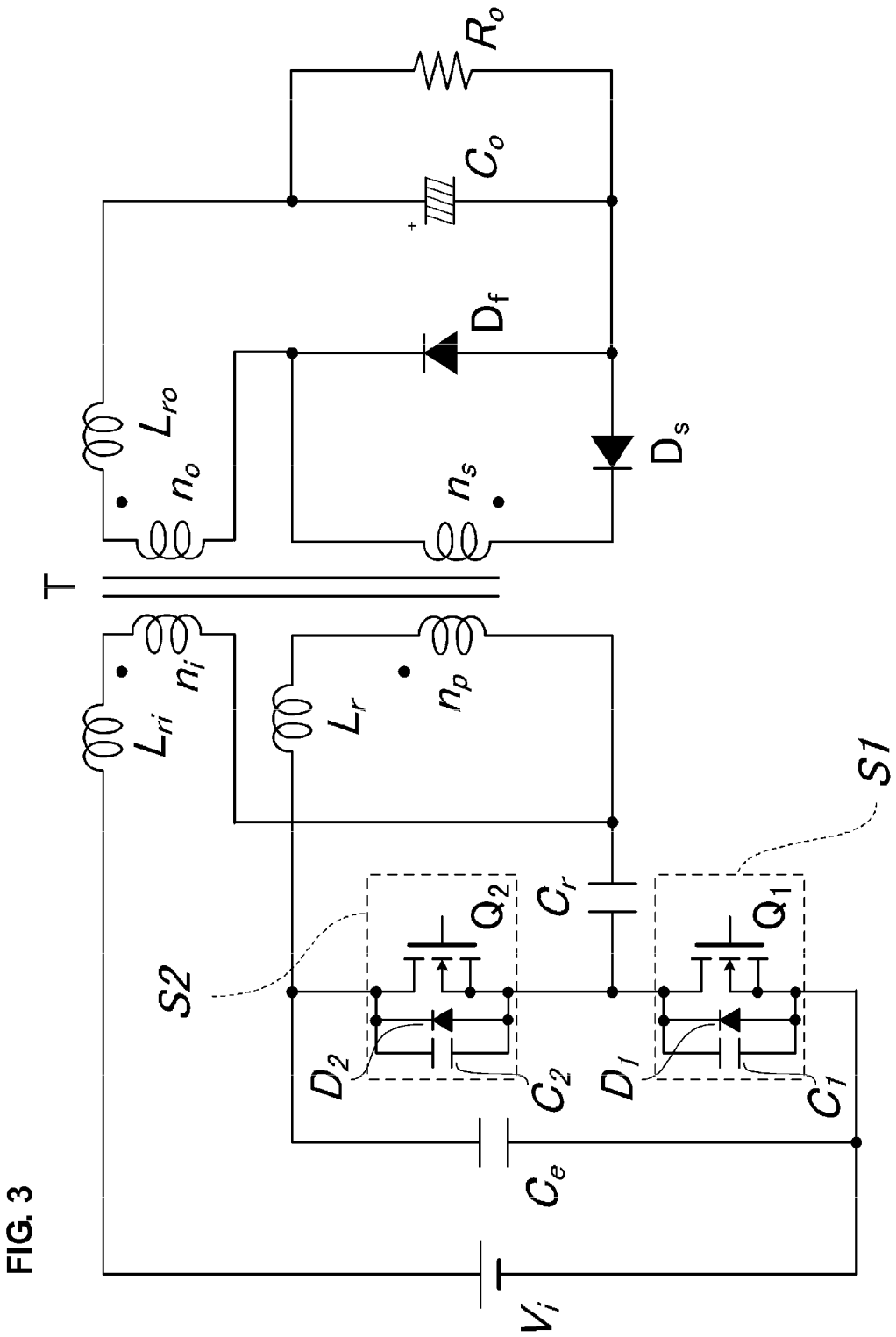
FIG. 3 is a circuit diagram of an isolated switching power supply apparatus according to a second preferred embodiment of the present invention.

FIG. 3 is a circuit diagram of an isolated switching power supply apparatus according to a second preferred embodiment. The difference from the circuit illustrated in FIG. 2 is the position where the third diode Ds is connected. That is, in FIG. 3, the anode of the fourth diode Df is connected to the anode of the fourth diode Df. The other portions of the configuration are the same as those illustrated in FIG. 2.

This configuration also provides advantages similar to those of the first preferred embodiment of the present invention.

The advantages provided by the configuration of the isolated switching power supply apparatus according to the second preferred embodiment are, among the advantages achieved by the first preferred embodiment of the present invention described above.

Third Preferred Embodiment

Figure 4:
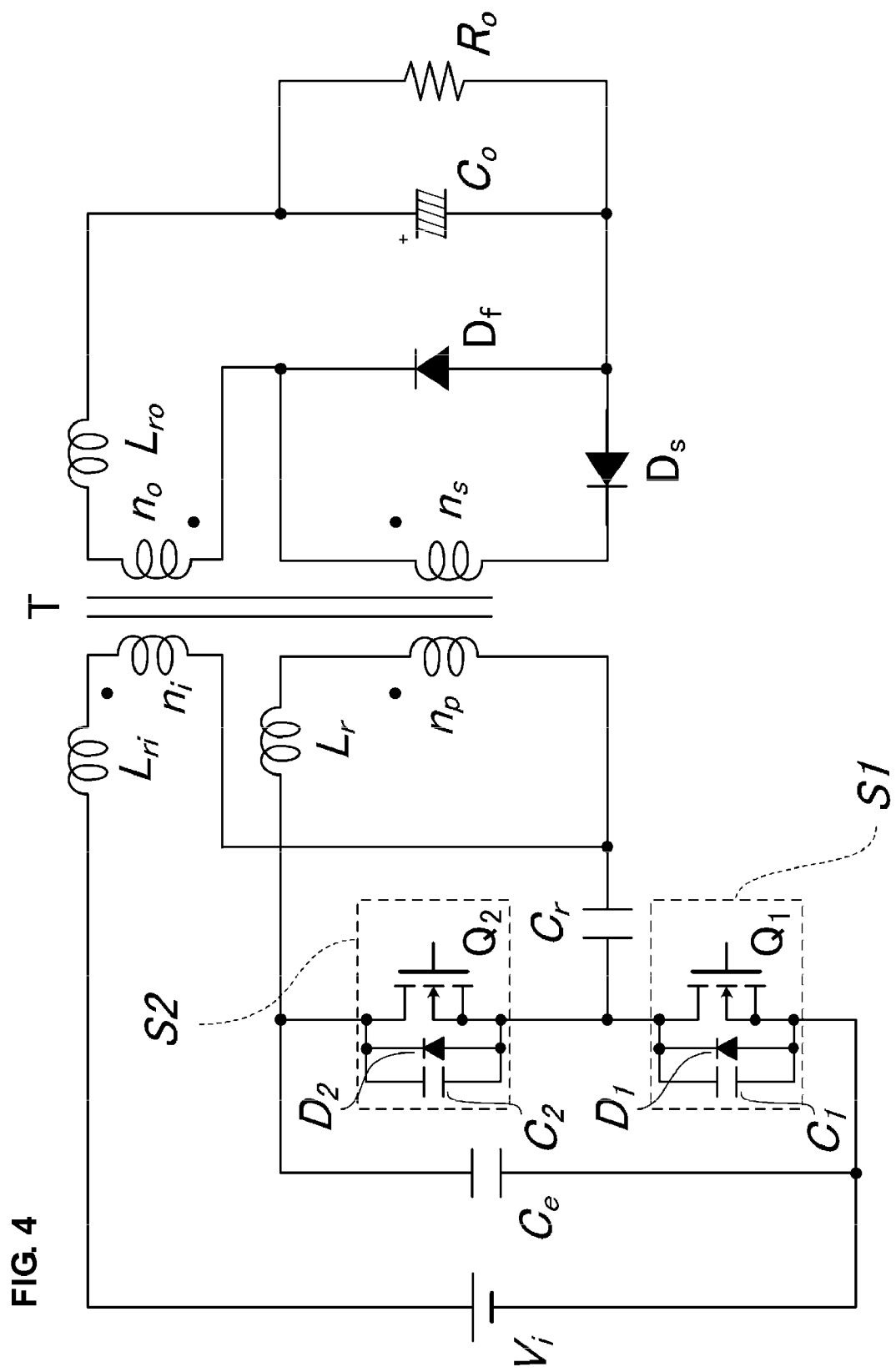
FIG. 4 is a circuit diagram of an isolated switching power supply apparatus according to a third preferred embodiment of the present invention.

FIG. 4 is a circuit diagram of an isolated switching power supply apparatus according to a third preferred embodiment. The differences from the circuit illustrated in FIG. 2 are that the first primary winding np and the first secondary winding ns operate as a forward system and the second primary winding ni and the second secondary winding no operate as a flyback system. In other words, referring to FIG. 4, while the first switching device Q1 is on and the second switching device Q2 is off, a voltage is induced in the first secondary winding ns, whereby the third diode Ds is turned on and a DC current is made to flow through the third inductor Lro, and a DC output voltage is applied to the load Ro.

While the first switching device Q1 is off and the second switching device Q2 is on, a voltage is induced in the second secondary winding no, whereby the fourth diode Df is turned on and a DC current is made to flow through the third inductor Lro, and a DC output voltage is applied to the load Ro. The other portions of the configuration are the same as those illustrated in FIG. 2.

This configuration also provides advantages similar to those of the first preferred embodiment as described above.

The advantages provided by the configuration of the isolated switching power supply apparatus according to the third preferred embodiment are, among the advantages achieved by the first preferred embodiment as described above.

Fourth Preferred Embodiment

Figure 5:
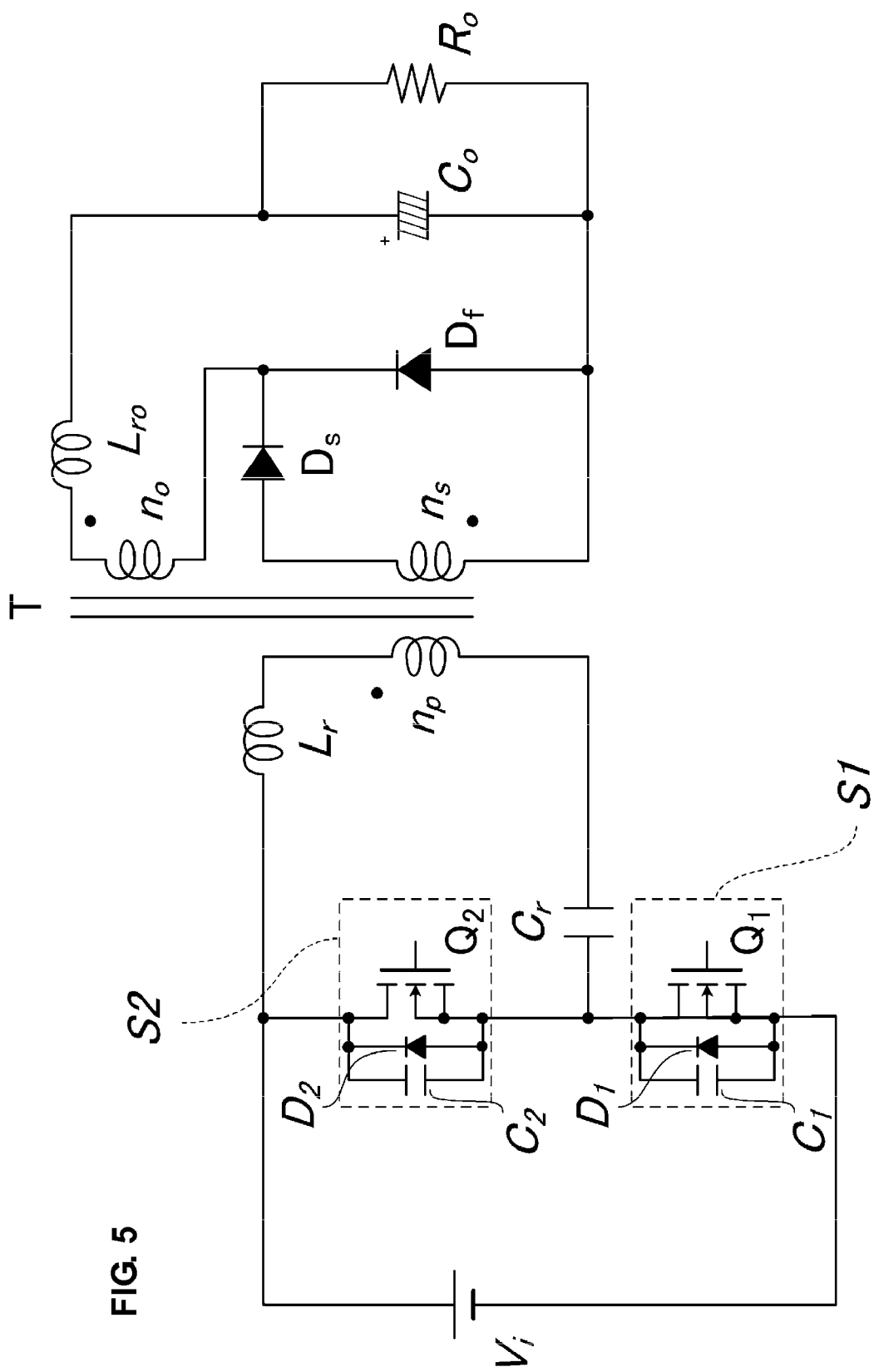
FIG. 5 is a circuit diagram of an isolated switching power supply apparatus according to a fourth preferred embodiment of the present invention.

FIG. 5 is a circuit diagram of an isolated switching power supply apparatus according to a fourth preferred embodiment, and illustrates an exemplary configuration in which the second primary winding ni and the second secondary winding no have been removed from the first preferred embodiment. In the first preferred embodiment, the number of turns of the first primary winding np is preferably the same as the number of turns of the second primary winding ni in order to make the energy transmitted while the first switch circuit S1 is on the same as the energy transmitted while the second switch circuit S2 is on. In other words, since a current flows through the second primary winding ni while the first switch circuit S1 is on and a current flows through the first primary winding np while the second switch circuit S2 is on, it is possible to omit the second primary winding ni and to drive the transformer T using only the first primary winding np. The rest of the points are the same as those of the first preferred embodiment, and the description thereof is omitted.

Compared with the first preferred embodiment, the fourth preferred embodiment, which does not require the second primary winding ni, can be further reduced in size.

The advantages provided by the configuration of the isolated switching power supply apparatus according to the fourth preferred embodiment are, among most of the advantages achieved by the first preferred embodiment as described above.

Fifth Preferred Embodiment

Figure 6:
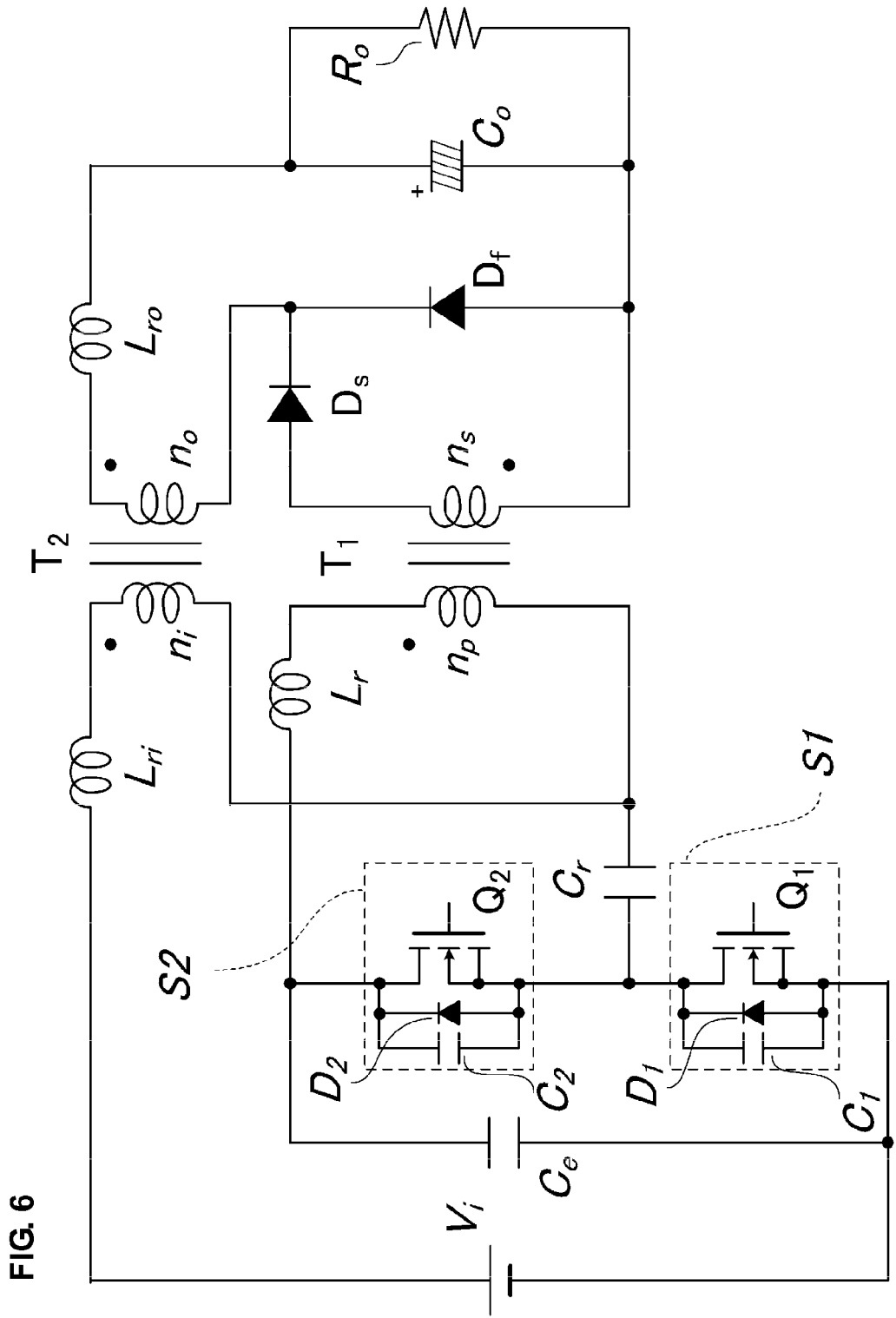
FIG. 6 is a circuit diagram of an isolated switching power supply apparatus according to a fifth preferred embodiment of the present invention.

FIG. 6 is a circuit diagram of an isolated switching power supply apparatus according to a fifth preferred embodiment, and illustrates an exemplary configuration in which a first transformer T1 includes the first primary winding np and the first secondary winding ns in the first preferred embodiment, and a second transformer T2 includes the second primary winding ni and the second secondary winding no in the first preferred embodiment. The rest of the points are the same as those of the first preferred embodiment, and the description thereof is omitted.

Although the fifth preferred embodiment, having two separate transformers, has a disadvantage in terms of size compared with the first preferred embodiment, the first transformer T1 and the second transformer T2 are small and provide more freedom in the arrangement thereof in terms of mounting.

The advantages provided by the configuration of the isolated switching power supply apparatus according to the fifth preferred embodiment are, among the advantages achieved by the first preferred embodiment as described above.

Sixth Preferred Embodiment

Figure 7:
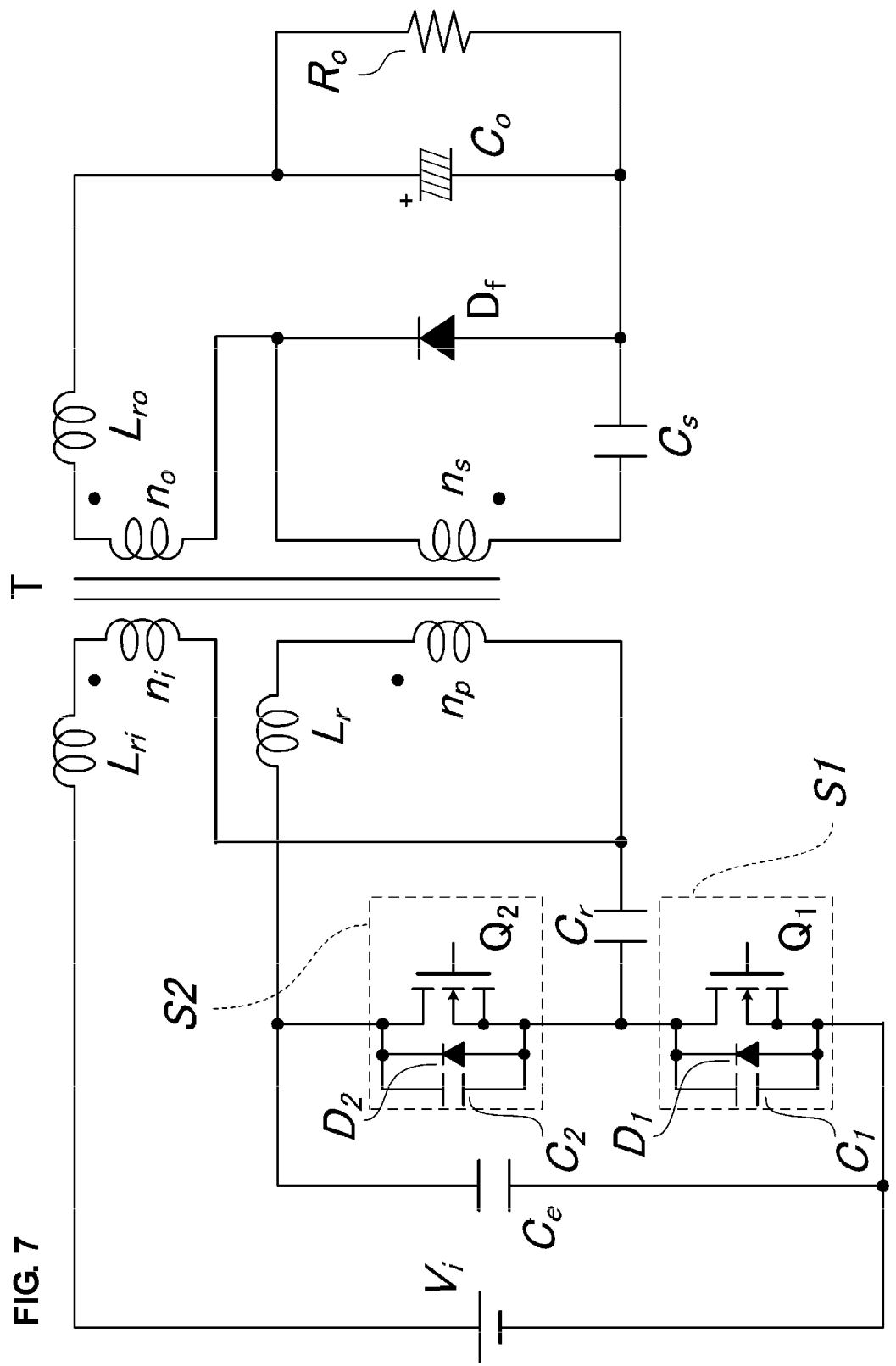
FIG. 7 is a circuit diagram of an isolated switching power supply apparatus according to a sixth preferred embodiment of the present invention.

FIG. 7 is a circuit diagram of an isolated switching power supply apparatus according to a sixth preferred embodiment. The difference from the circuit illustrated in FIG. 6 is that the secondary side third diode Ds has been replaced by a sixth capacitor Cs. Referring to FIG. 6, the third diode Ds is off when the first switching device Q1 is on and the second switching device Q2 is off, and the third diode Ds is on when the first switching device Q1 is off and the second switching device Q2 is on.

On the other hand, the circuit in FIG. 7 constitutes a voltage-doubler rectifier circuit. The sixth capacitor Cs is charged when the first switching device Q1 is on and the second switching device Q2 is off, and a voltage twice the voltage of the preferred embodiment illustrated in FIG. 4 is output from the first secondary winding ns when the first switching device Q1 is off and the second switching device Q2 is on. The rest of the points are the same as those of the first preferred embodiment, and the description thereof is omitted.

In the sixth preferred embodiment, compared with the first preferred embodiment, since there is no third diode Ds, there is no loss due to a forward-direction voltage drop therethrough when a load current is large, resulting in an advantage of high efficiency.

In the sixth preferred embodiment, it is preferable to make the turn ratio of the first secondary winding ns to the second secondary winding no of the composite transformer T as follows:

$$ns:no=1:1.$$

In this case, by letting a voltage induced in the first secondary winding ns be Vo1, a voltage induced in the second secondary winding no be Vo2, and a voltage output to the load Ro be Vo, Vo is given by:

$$Vo=Vo2$$

when the first switching device Q1 is on and the second switching device Q2 is off. When the first switching device Q1 is off and the second switching device Q2 is on, since the sixth capacitor Cs and the fourth diode Df constitute a voltage-doubler rectifier circuit, the output voltage Vo is given by:

$$Vo=2Vo1-Vo2=2Vo2-Vo2=Vo2$$

Hence a configuration is realized in which there is no output ripple voltage and the core of the composite transformer T is most unlikely to be magnetically saturated.

The advantages provided by the configuration of the isolated switching power supply apparatus according to the sixth preferred embodiment are, among the advantages achieved by the first preferred embodiment as described above.

Seventh Preferred Embodiment

Figure 8:
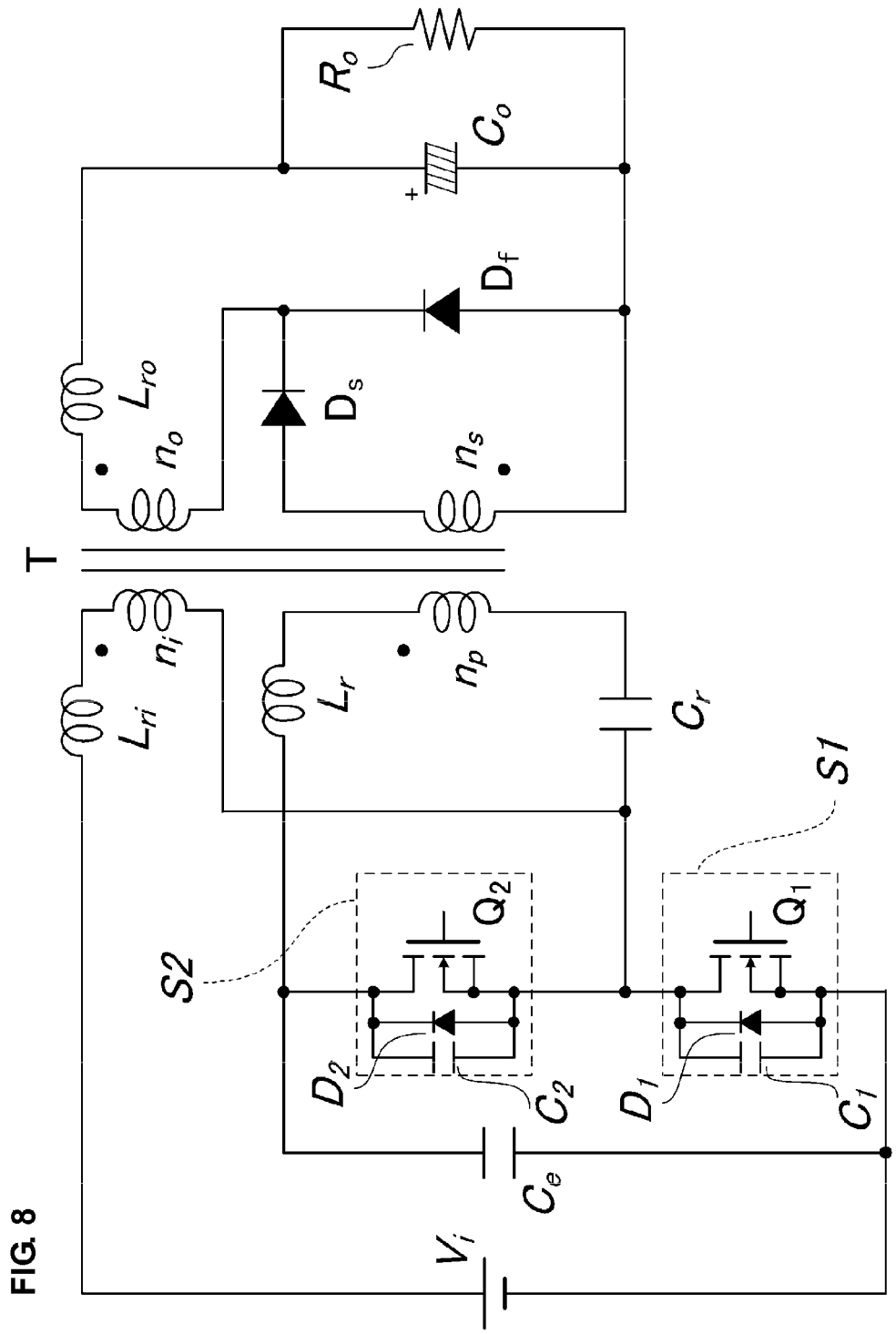
FIG. 8 is a circuit diagram of an isolated switching power supply apparatus according to a seventh preferred embodiment of the present invention.

FIG. 8 is a circuit diagram of an isolated switching power supply apparatus according to a seventh preferred embodiment.

The difference from the circuit illustrated in FIG. 6 is the position where the third capacitor Cr is connected. That is, in FIG. 8, the third capacitor Cr is connected between the first primary winding np and the second primary winding ni. The other portions of the configuration are the same as those illustrated in FIG. 6.

This configuration also provides advantages similar to those achieved by the first preferred embodiment as described above.

The advantages provided by the configuration of the isolated switching power supply apparatus according to the seventh preferred embodiment are, among the advantages achieved by the first preferred embodiment as described above.

Eighth Preferred Embodiment

FIG. 9 is a circuit diagram of an isolated switching power supply apparatus according to an eighth preferred embodiment.

The difference from the circuit illustrated in FIG. 7 is the position where the third capacitor Cr is connected. That is, in FIG. 9, the third capacitor Cr is connected between the second switch circuit S2 and the connection node of the second inductor Lr and the fourth capacitor Ce. The other portions of the configuration are the same as those illustrated in FIG. 7.

This configuration also provides advantages similar to those achieved by the first preferred embodiment as described above.

In the eighth preferred embodiment, compared with the first preferred embodiment, since there is no third diode Ds, there is no loss due to a forward-direction voltage drop therethrough when a load current is large, resulting in an advantage of high efficiency.

In the eighth preferred embodiment, it is preferable to make the winding turn ratio of the first secondary winding ns to the second secondary winding no of the composite transformer T as follows:

ns:no=1:1.

The reason for this is the same as that described in the sixth preferred embodiment.

The advantages provided by the configuration of the isolated switching power supply apparatus according to the eighth preferred embodiment are, among the advantages achieved by the first preferred embodiment as described above.

Ninth Preferred Embodiment

Figure 10:
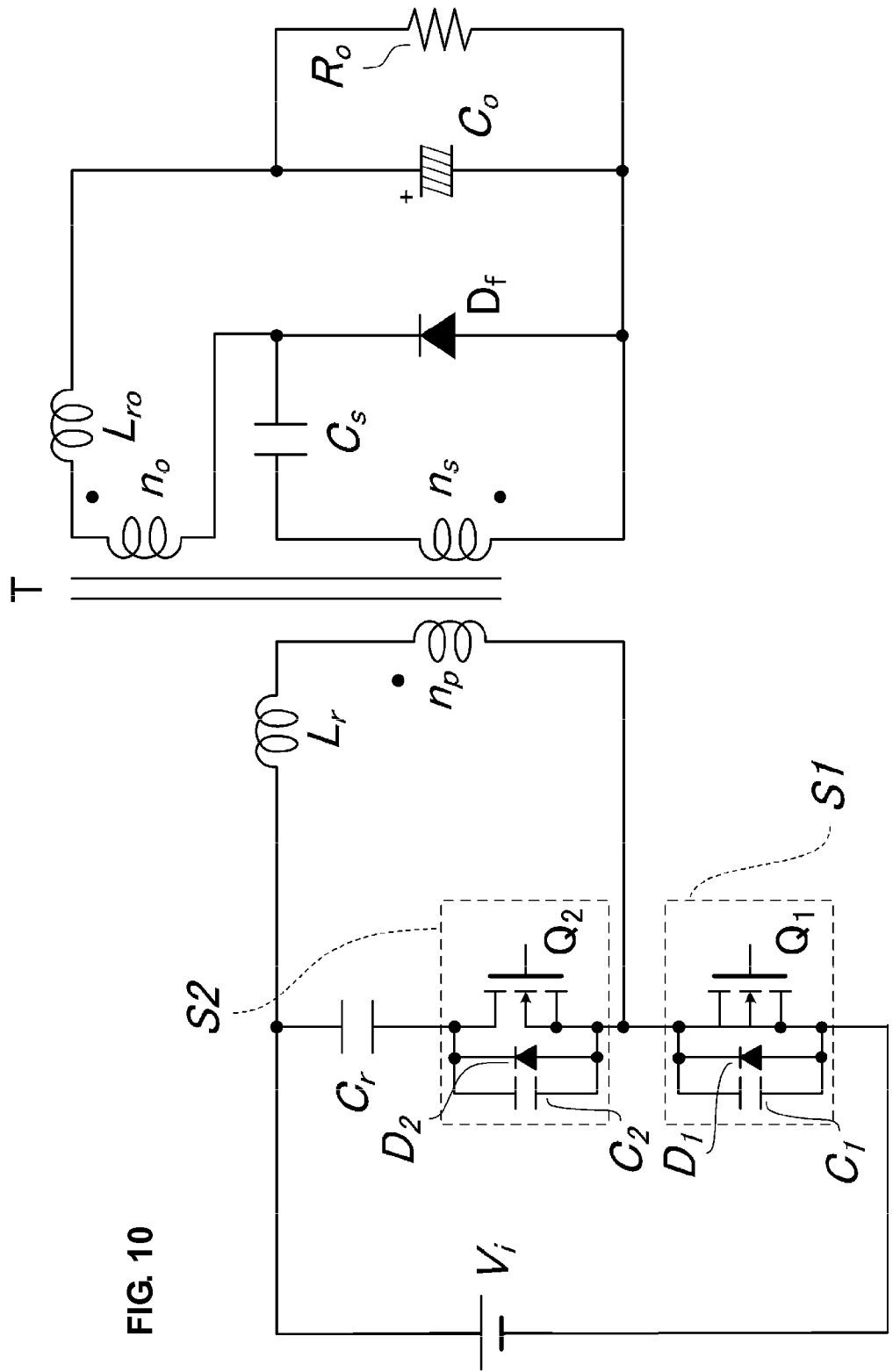
FIG. 10 is a circuit diagram of an isolated switching power supply apparatus according to a ninth preferred embodiment of the present invention.

FIG. 10 is a circuit diagram of an isolated switching power supply apparatus according to a ninth preferred embodiment.

The isolated switching power supply apparatus illustrated in FIG. 10 has a configuration in which the second primary winding ni has been removed from the isolated switching power supply apparatus of the eighth preferred embodiment illustrated in FIG. 10 similarly to the fourth preferred embodiment, and the transformer T is driven only by the first primary winding np. The rest of the points are the same as those of the first preferred embodiment, and the description thereof is omitted.

This configuration also provides advantages similar to those achieved by the first preferred embodiment as described above.

The advantages provided by the configuration of the isolated switching power supply apparatus according to the ninth preferred embodiment are, among the advantages achieved by the first preferred embodiment as described above.

Tenth Preferred Embodiment

Figure 11:
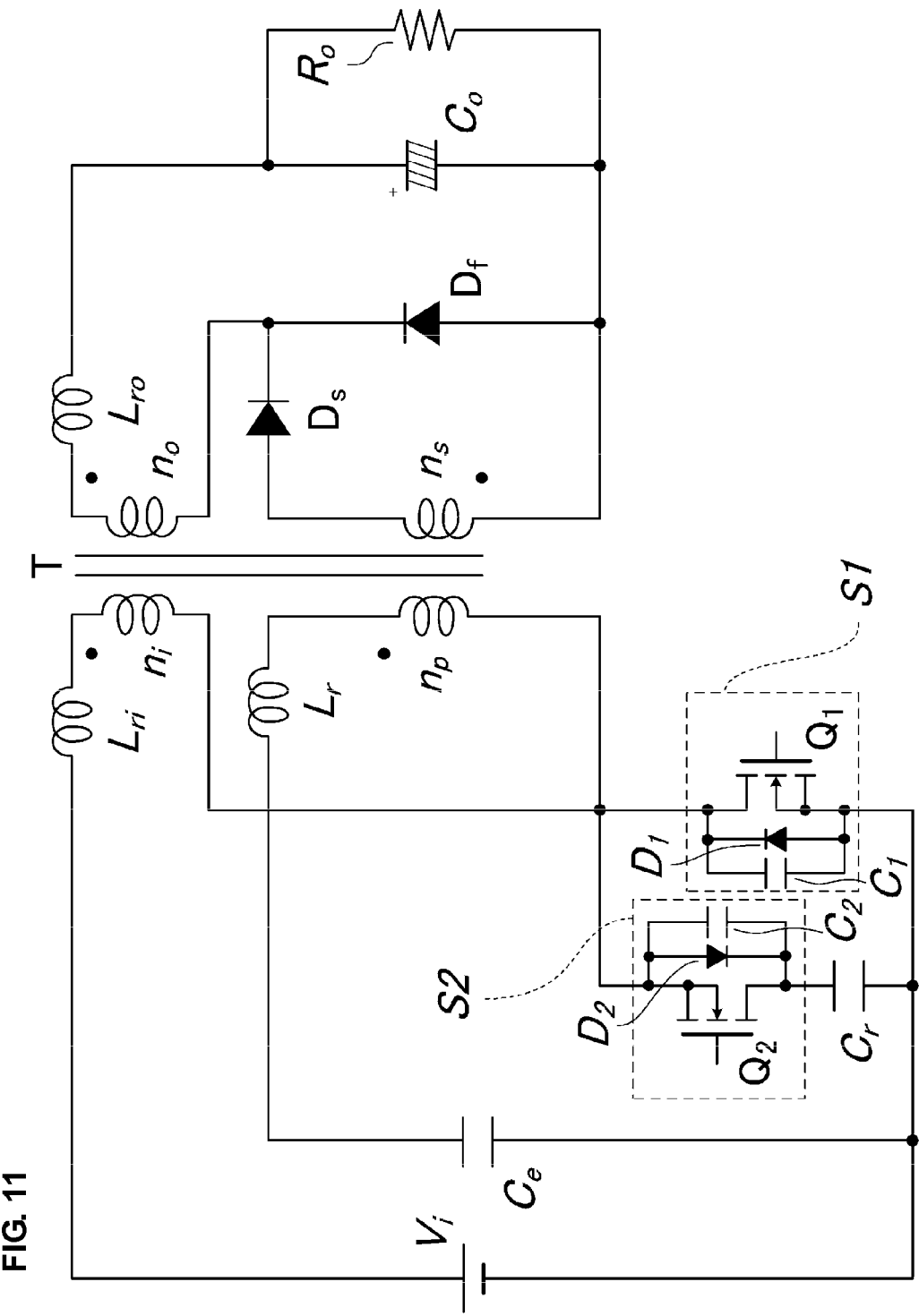
FIG. 11 is a circuit diagram of an isolated switching power supply apparatus according to a tenth preferred embodiment of the present invention.

FIG. 11 is a circuit diagram of an isolated switching power supply apparatus according to a tenth preferred embodiment.

In the isolated switching power supply apparatus illustrated in FIG. 11, a series circuit including the first inductor Lri, the second primary winding ni of the composite transformer T, and the first switch circuit S1 is connected between the + terminal and the − terminal of the power input portion to which the DC voltage V1 is applied. Further, a series circuit including the first primary winding np of the composite transformer T, the second inductor Lr, and the fourth capacitor Ce, and a series circuit including the second switch circuit S2 and the third capacitor Cr, are connected in parallel with one another between the − terminal of the power input portion and the connection node of the first primary winding ni of the composite transformer T and the first switch circuit S1. The rest of the points are the same as those of the first preferred embodiment, and the description thereof is omitted.

This configuration also provides advantages similar to those achieved by the first preferred embodiment as described above.

The advantages provided by the configuration of the isolated switching power supply apparatus according to the tenth preferred embodiment are, among the advantages achieved by the first preferred embodiment as described above.

Eleventh Preferred Embodiment

Figure 12:
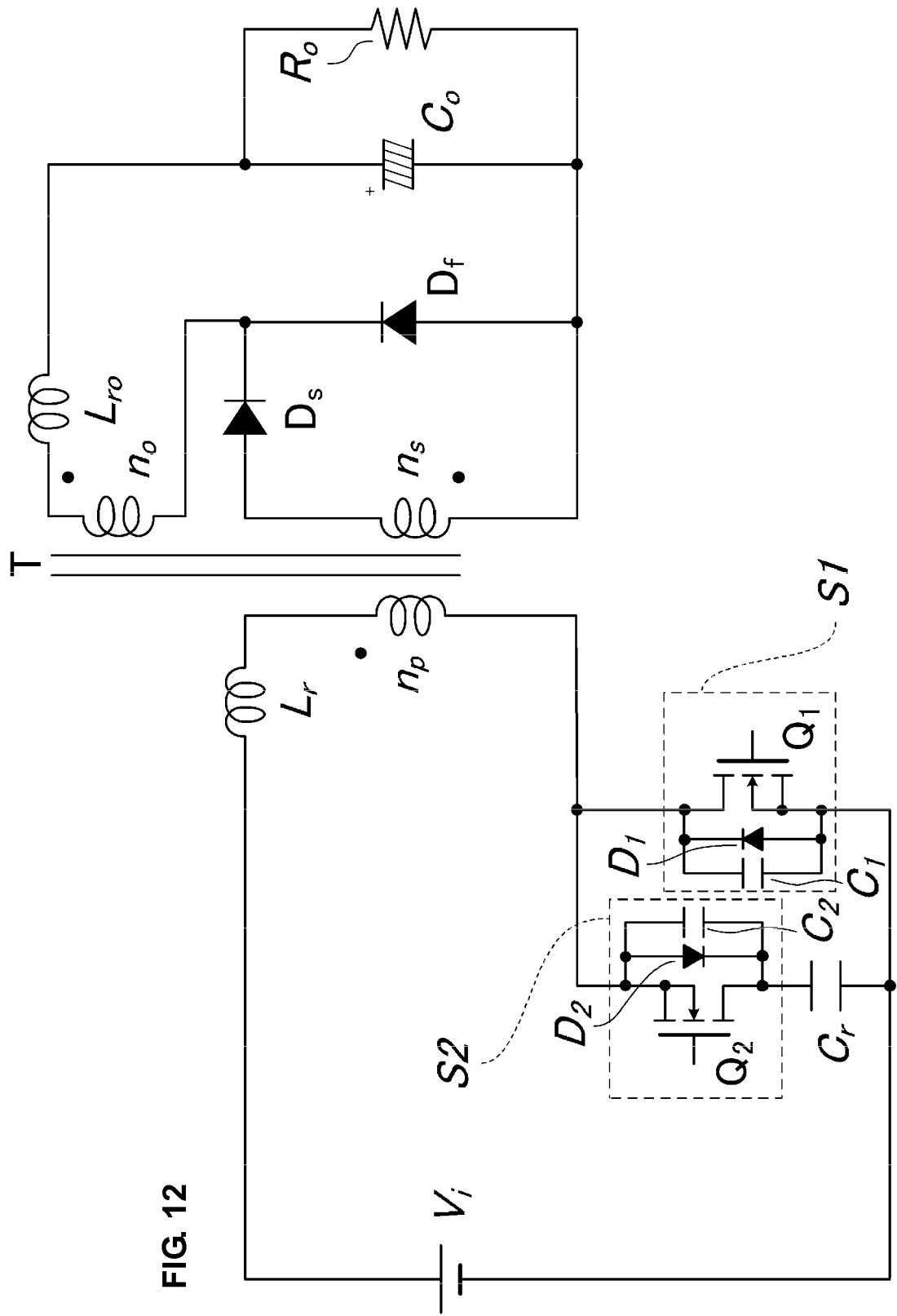
FIG. 12 is a circuit diagram of an isolated switching power supply apparatus according to an eleventh preferred embodiment of the present invention.

FIG. 12 is a circuit diagram of an isolated switching power supply apparatus according to an eleventh preferred embodiment.

The isolated switching power supply apparatus illustrated in FIG. 12 has a configuration in which the second primary winding ni has been removed from the isolated switching power supply apparatus of the tenth preferred embodiment illustrated in FIG. 11 similarly to the fourth preferred embodiment, and the transformer T is driven only by the first primary winding np. The rest of the points are the same as those of the first preferred embodiment, and the description thereof is omitted.

This configuration also provides advantages similar to those achieved by the first preferred embodiment as described above.

The advantages provided by the configuration of the isolated switching power supply apparatus according to the eleventh preferred embodiment are, among the advantages achieved by the first preferred embodiment as described above.

Twelfth Preferred Embodiment

Figure 13:
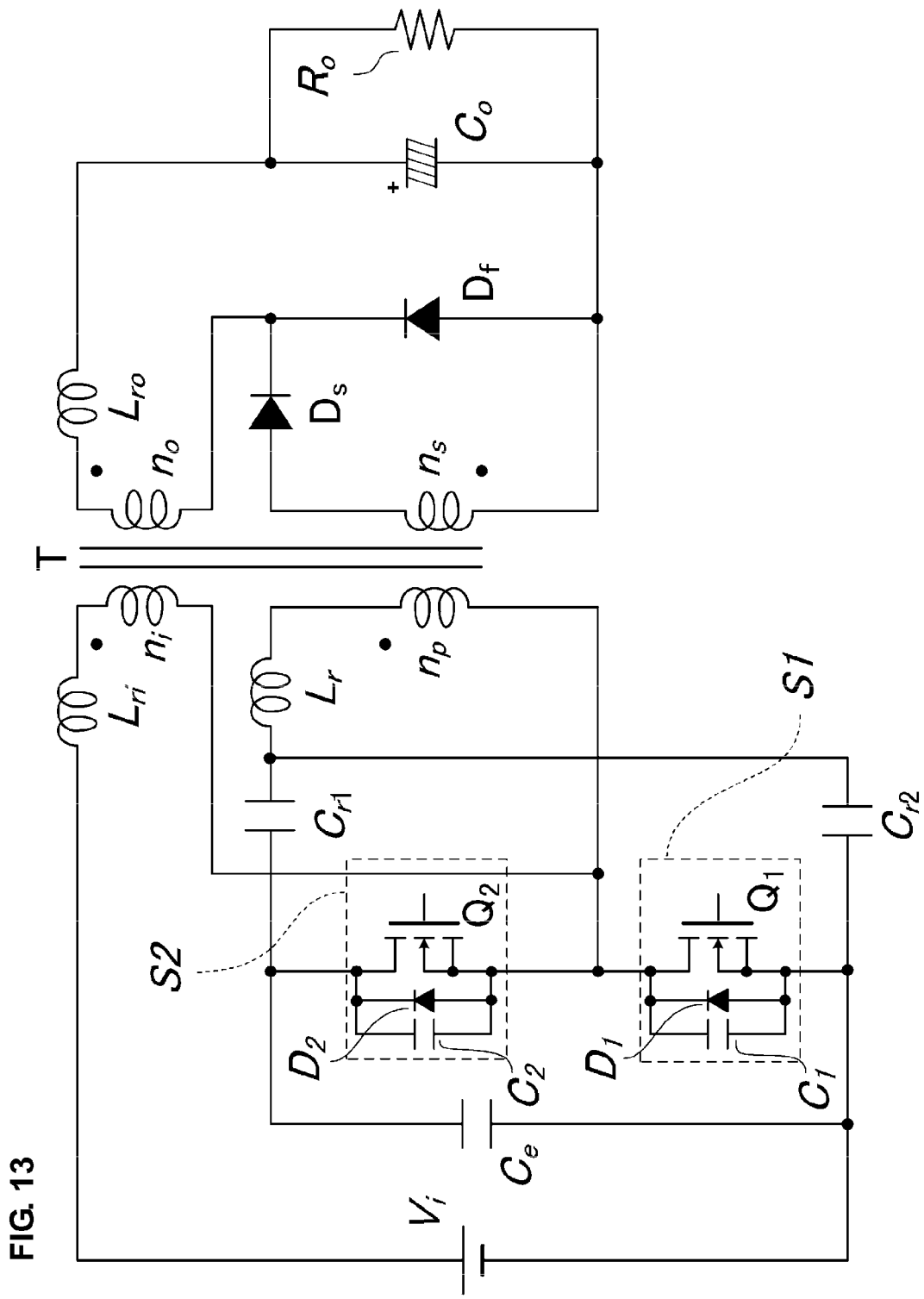
FIG. 13 is a circuit diagram of an isolated switching power supply apparatus according to a twelfth preferred embodiment of the present invention.

FIG. 13 is a circuit diagram of an isolated switching power supply apparatus according to a twelfth preferred embodiment.

The isolated switching power supply apparatus illustrated in FIG. 13 has a configuration in which the third capacitor Cr in the seventh preferred embodiment illustrated in FIG. 8 has been divided into a seventh capacitor Cr1 and an eighth capacitor Cr2. In other words, a series circuit including the first inductor Lri and the second primary winding ni of the composite transformer T, and the first switch circuit S1 is connected between the + terminal and the − terminal of the power input portion to which the DC voltage V1 is applied, and a series circuit including the first primary winding np of the composite transformer T, the second inductor Lr, and the seventh capacitor Cr1, and the fourth capacitor Ce is connected between the − terminal of the power input portion and the connection node of the second primary winding ni of the composite transformer T and the first switch circuit S1. Further, the second switch circuit S2 is connected between the connection node of the seventh capacitor Cr1 and the fourth capacitor Ce and the connection node of the second primary winding ni and the first switch circuit S1, the eighth capacitor Cr2 is connected between the − terminal of the power input portion and the connection node of the second inductor Lr and the seventh capacitor Cr1. The rest of the points are the same as those of the first preferred embodiment, and the description thereof is omitted.

This configuration also provides advantages similar to those achieved by the first preferred embodiment as described above.

The advantages provided by the configuration of the isolated switching power supply apparatus according to the twelfth preferred embodiment are, among the advantages achieved in the first preferred embodiment as described above.

Thirteenth Preferred Embodiment

Figure 14:
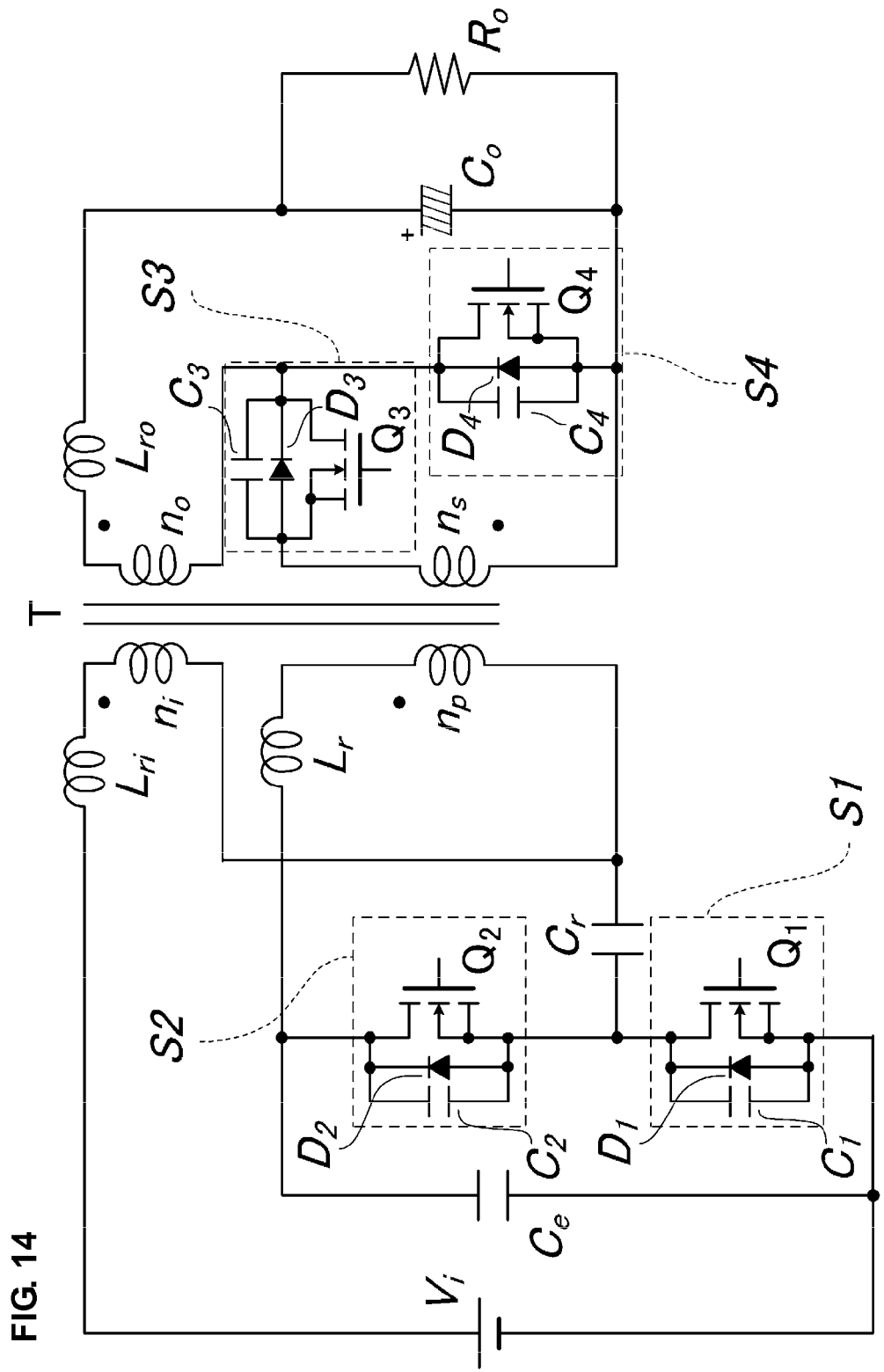
FIG. 14 is a circuit diagram of an isolated switching power supply apparatus according to a thirteenth preferred embodiment of the present invention.

FIG. 14 is a circuit diagram of an isolated switching power supply apparatus according to a thirteenth preferred embodiment.

The isolated switching power supply apparatus illustrated in FIG. 14 is different from the first preferred embodiment in that a synchronous rectifier circuit is provided by replacing the third diode Ds and the fourth diode Df with a third switch circuit S3 including a third switching device Q3, a fifth diode D3, and a ninth capacitor C3, connected in parallel with one another, and a fourth switch circuit S4 including a fourth switching device Q4, a sixth diode D4, and a tenth capacitor C4, connected in parallel with one another. It is preferable to use field effect transistors for the third switch circuit S3 and the fourth switch circuit S4. The rest of the points are the same as those of the first preferred embodiment, and the description thereof is omitted.

This configuration also provides advantages similar to those achieved by the first preferred embodiment as described above.

The advantages provided by the configuration of the isolated switching power supply apparatus according to the thirteenth preferred embodiment are, among the advantages achieved by the first preferred embodiment of the present invention.

Fourteenth Preferred Embodiment

Figure 15:
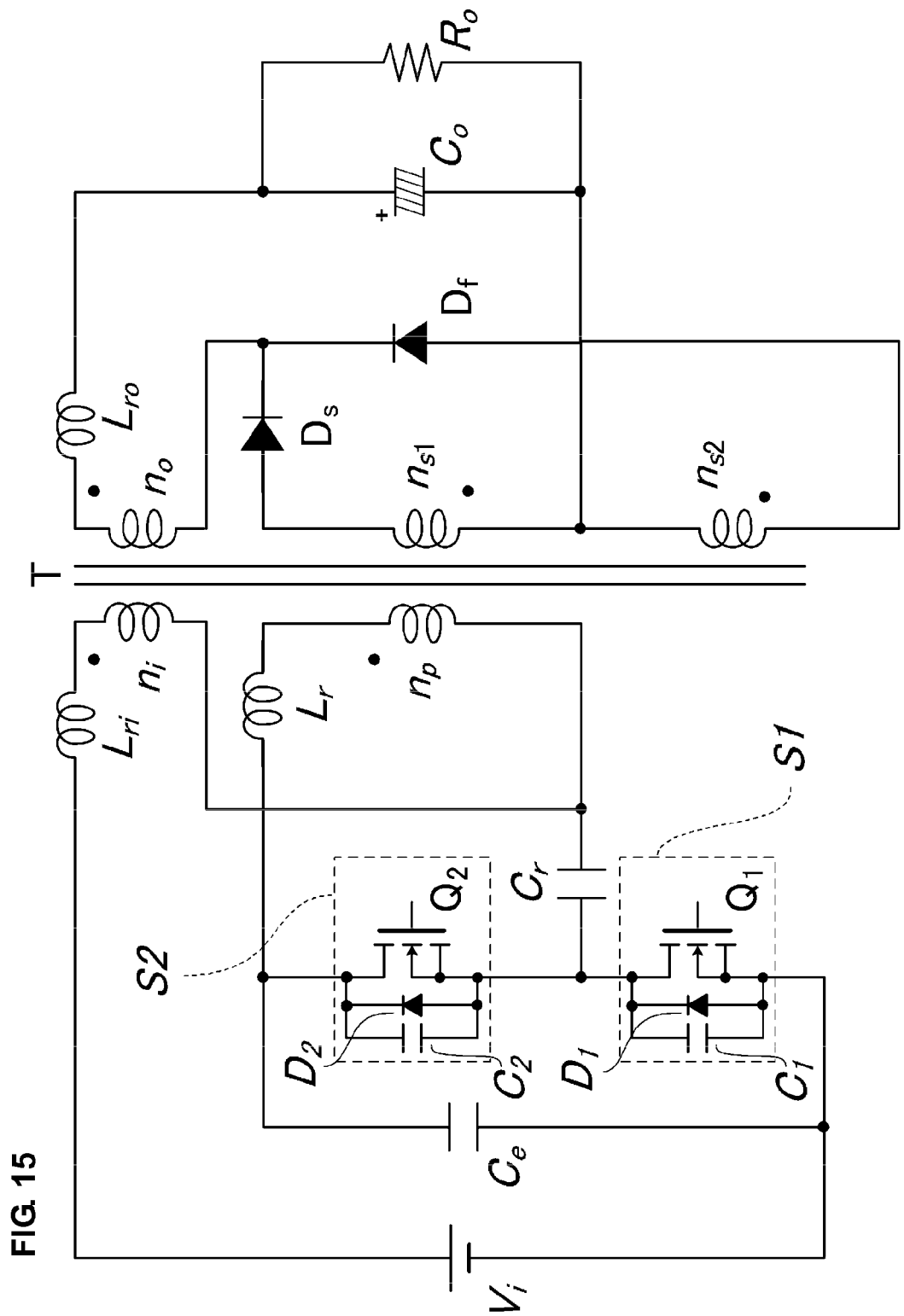
FIG. 15 is a circuit diagram of an isolated switching power supply apparatus according to a fourteenth preferred embodiment of the present invention.

FIG. 15 is a circuit diagram of an isolated switching power supply apparatus according to a fourteenth preferred embodiment.

The isolated switching power supply apparatus illustrated in FIG. 15 is different from the first preferred embodiment in that a center tap full wave rectifier is provided by a first secondary winding ns including a third secondary winding ns1 and a fourth secondary winding ns2, the third diode Ds, and the fourth diode Df. The rest of the points are the same as those of the first preferred embodiment, and the description thereof is omitted.

This configuration also provides advantages similar to those achieved by the first preferred embodiment as described above.

The advantages provided by the configuration of the isolated switching power supply apparatus according to the fourteenth preferred embodiment are, among the advantages achieved by the first preferred embodiment as described above.

Fifteenth Preferred Embodiment

Figure 16:
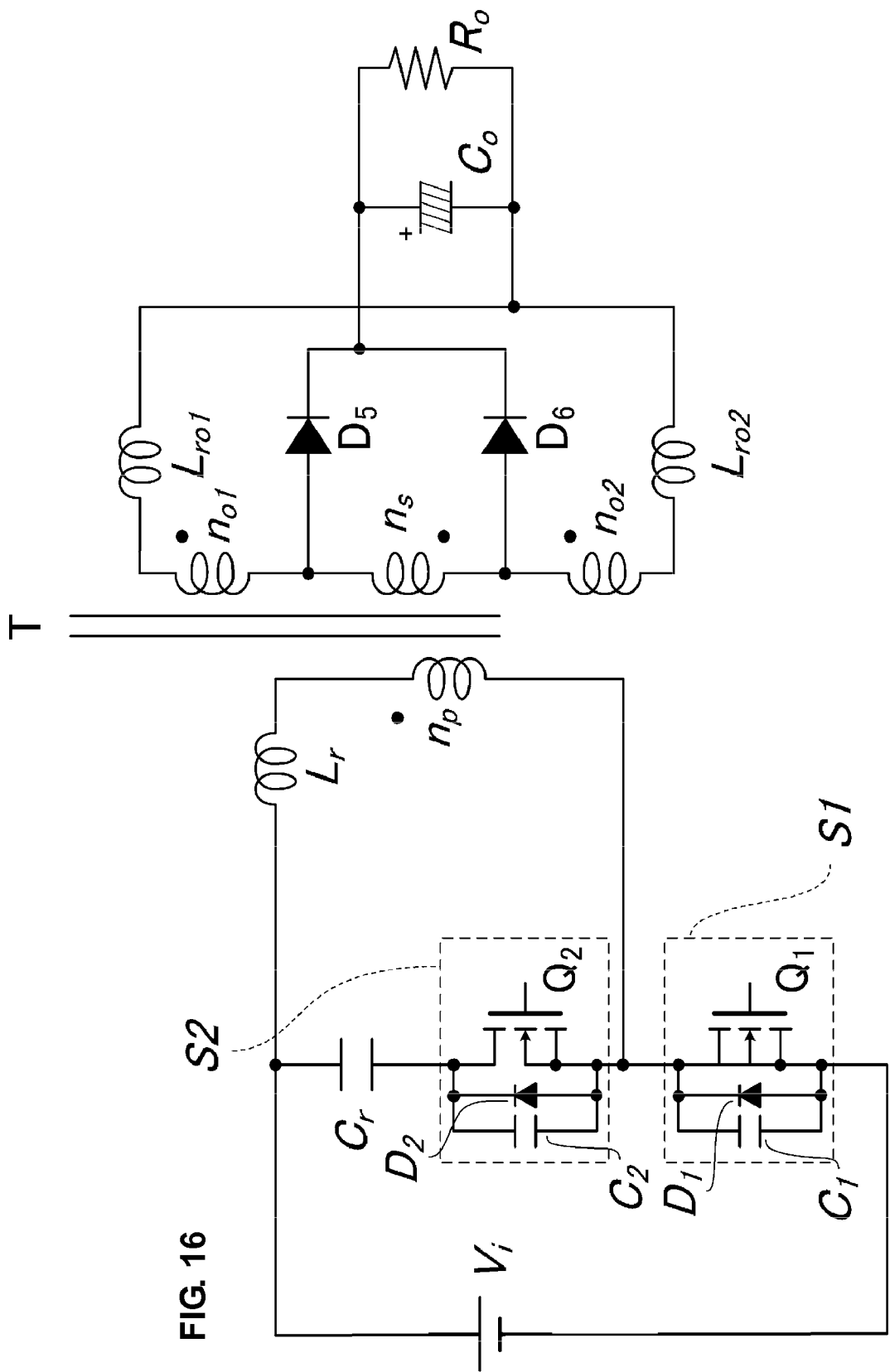
FIG. 16 is a circuit diagram of an isolated switching power supply apparatus according to a fifteenth preferred embodiment of the present invention.

FIG. 16 is a circuit diagram of an isolated switching power supply apparatus according to a fifteenth preferred embodiment.

In the isolated switching power supply apparatus illustrated in FIG. 16, the primary side circuit is preferably the same as that in the isolated switching power supply apparatus of the ninth preferred embodiment illustrated in FIG. 10. In the secondary side circuit, a second secondary winding no includes a fifth secondary winding no1 and a sixth secondary winding no2, and one end of the fifth secondary winding no1 and one end of the sixth secondary winding no2 are connected to respective ends of the first secondary winding ns. The other ends are connected via a fourth inductor Lro1 and a fifth inductor Lro2 to each other and to one end of the load Ro.

The respective ends of the first secondary winding ns are connected to each other via a seventh diode D5 and an eighth diode D6 and the connection node thereof is connected to the other end of the load Ro.

The secondary circuit with these connections constitutes a current doubler rectifier circuit. The rest of the points are the same as those of the first preferred embodiment, and the description thereof is omitted.

This configuration also provides advantages similar to those achieved by the first preferred embodiment as described above.

The advantages provided by the configuration of the isolated switching power supply apparatus according to the fifteenth preferred embodiment are, among the advantages achieved by the first preferred embodiment as described above.

Sixteenth Preferred Embodiment

Figure 17:
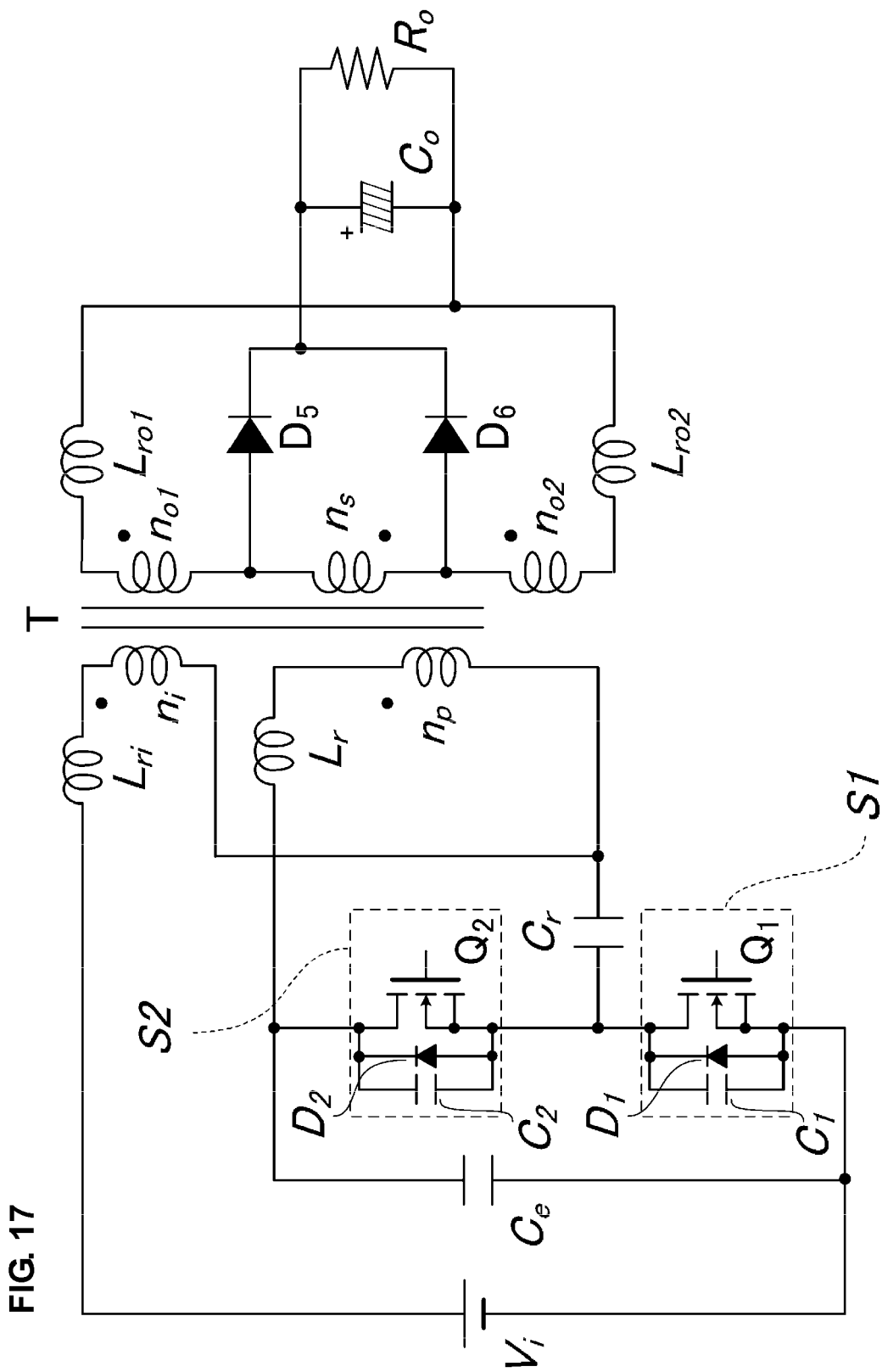
FIG. 17 is a circuit diagram of an isolated switching power supply apparatus according to a sixteenth preferred embodiment of the present invention.

FIG. 17 is a circuit diagram of an isolated switching power supply apparatus according to a sixteenth preferred embodiment.

The isolated switching power supply apparatus illustrated in FIG. 17 has a secondary circuit which is preferably the same as that of isolated switching power supply apparatus of the fifteenth preferred embodiment illustrated in FIG. 16, and the rest of the points are the same as those of the first preferred embodiment. Hence, the description thereof is omitted.

This configuration also provides advantages similar to those achieved by the first preferred embodiment as described above.

The advantages provided by the configuration of the isolated switching power supply apparatus according to the sixteen preferred embodiment are, among the advantages achieved by the first preferred embodiment as described above.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An isolated switching power supply apparatus comprising:
   a DC power input portion to which a DC input voltage is input;
   a transformer including a first primary winding, a first secondary winding, and a second secondary winding magnetically coupled with one another;
   a first inductor connected in series to the second primary winding;
   a second inductor connected in series to the first primary winding;
   a rectifier circuit including a first rectifier device arranged to rectify a sum of a current generated in the first secondary winding and a current generated in the second secondary winding and a second rectifier device arranged to rectify a current generated in the second secondary winding;
   a first switch circuit including a first switching device, a first capacitor, and a first diode, that are connected in parallel with one another;
   a second switch circuit including a second switching device, a second capacitor, and a second diode, that are connected in parallel with one another;
   a third capacitor;
   a first series circuit that is connected to both terminals of the DC power input portion and in which the first primary winding or the second primary winding, and the first switch circuit are connected in series with one another; and
   a second series circuit that is connected to both ends of the first switch circuit, both ends of the first primary winding, or both ends of the second primary winding and in which the second switch circuit and the third capacitor are connected in series with one another; wherein
   the first switch circuit and the second switch circuit are arranged to complementarily and repeatedly enter on/off states with a period therebetween in which both are in off states;
   windings of the transformer are arranged such that energy is transmitted from a primary side to a secondary side complementarily by the first secondary winding or the second secondary winding in synchronization with complementary on/off operations of the first switch circuit and the second switch circuit;
   magnetic polarities of the first secondary winding and the second secondary winding are opposite to each other; and
   an output voltage is output to the secondary side via the third inductor.

2. An isolated switching power supply apparatus comprising:
   a DC power input portion to which a DC input voltage is input;
   a transformer including a first primary winding, a first secondary winding, a second primary winding, and a second secondary winding, magnetically coupled with one another;
   a second inductor connected in series to the first primary winding;
   a first inductor connected in series to the second primary winding;
   a third inductor connected in series to the first secondary winding;
   a rectifier circuit including a first rectifier device arranged to rectify a sum of a current generated in the first secondary winding and a current generated in the second secondary winding and a second rectifier device arranged to rectify a current generated in the second secondary winding;
   a first switch circuit including a first switching device, a first capacitor, and a first diode, that are connected in parallel with one another;
   a second switch circuit including a second switching device, a second capacitor, and a second diode, that are connected in parallel with one another;
   a third capacitor;
   a first series circuit that is connected to both terminals of the DC power input portion and in which the first primary winding or the second primary winding, and the first switch circuit are connected in series with one another;
   a second series circuit that is connected to both ends of the first switch circuit, both ends of the first primary winding, or both ends of the second primary winding ni and in which the second switch circuit and the third capacitor are connected in series with one another; and
   a fourth capacitor connected in parallel with the first series circuit; wherein
   the first switch circuit and the second switch circuit are arranged so as to complementarily and repeatedly enter on/off states with a period therebetween in which both are in off states;
   windings of the transformer are arranged such that energy is transmitted from a primary side to a secondary side complementarily by the first secondary winding or the second secondary winding in synchronization with complementary on/off operations of the first switch circuit and the second switch circuit;
   magnetic polarities of the first secondary winding and the second secondary winding are opposite to each other; and
   an output voltage is output to the secondary side via the third inductor.

3. The isolated switching power supply apparatus according to claim 2, wherein the transformer includes a first transformer including the first primary winding and the first secondary winding and a second transformer including the second primary winding and the second secondary winding.

4. The isolated switching power supply apparatus according to claim 1, wherein primary side magnetic flux leakage of the transformer is used as the second inductor.

5. The isolated switching power supply apparatus according to claim 1, wherein secondary side magnetic flux leakage of the transformer is used as the third inductor.

6. The isolated switching power supply apparatus according to claim 2, wherein primary side magnetic flux leakage of the transformer is used as the first inductor.

7. The isolated switching power supply apparatus according to claim 2, wherein, in the transformer, the first primary winding or the second primary winding is wound in a direction such that DC magnetic flux generated in a common magnetic core due to a current flowing through the second secondary winding is cancelled out and the first secondary winding has a magnetic polarity opposite to the polarity of the second secondary winding and has a greater number of turns than the second secondary winding.

8. The isolated switching power supply apparatus according to claim 7, wherein for a direction of a current that flows when the first switch circuit or the second switch circuit is in a conductive state, the first primary winding and the second primary winding have the same magnetic polarity and the first secondary winding and the second secondary winding have opposite magnetic polarities.

9. The isolated switching power supply apparatus according to claim 8, wherein the transformer has a weaker magnetic coupling strength than that of the second transformer.

10. The isolated switching power supply apparatus according to claim 1, wherein the first switch circuit and the second switch circuit include field effect transistors.

11. The isolated switching power supply apparatus according to claim 10, wherein the first switch circuit or the second switch circuit is driven so as to perform a zero voltage switching operation in which a switching device is turned on after a voltage across both ends of the switch circuit has decreased to or approximately to 0 V.

12. The isolated switching power supply apparatus according to claim 1, wherein the rectifier circuit includes a third diode arranged to rectify a current flowing through the first secondary winding during a period in which the energy is transmitted from the primary side to the secondary side by the first secondary winding, and a fourth diode arranged to rectify a current flowing through the second secondary winding during a period in which the energy is transmitted from the primary side to the secondary side by the second secondary winding.

13. The isolated switching power supply apparatus according to claim 12, wherein a synchronous rectifier configuration is used in which the third diode or the fourth diode is replaced by a field effect transistor.

14. The isolated switching power supply apparatus according to claim 1, wherein a ratio of a number of turns of the first secondary winding to a number of turns of the second secondary winding is 2:1.

15. The isolated switching power supply apparatus according to claim 1, wherein, in the transformer, at least a magnetic coupling between the first primary winding and the first secondary winding is relatively large and a magnetic coupling between the second secondary winding and each of other windings is relatively small.

16. The isolated switching power supply apparatus according to claim 1, wherein each of the first primary winding and the first secondary winding has a layered winding arrangement, and at least either the first secondary winding and the second secondary winding or the first primary winding and the second secondary winding has a split winding arrangement.

17. The isolated switching power supply apparatus according to claim 1, wherein the transformer includes a plurality of core legs, the first primary winding and the first secondary winding are wound around the same core leg, and at least the second secondary winding is wound around another core leg.

18. The isolated switching power supply apparatus according to claim 17, wherein the first primary winding and the first secondary winding has a layered winding arrangement, and at least either the first secondary winding and the second secondary winding or the first primary winding and the second secondary winding has a split winding arrangement.

19. The isolated switching power supply apparatus according to claim 1, wherein the first switch circuit and the second switch circuit are controlled to make the output voltage stable using pulse width modulation control.

20. The isolated switching power supply apparatus according to claim 1, wherein the third capacitor is connected between the first primary winding and the first switch circuit.

21. The isolated switching power supply apparatus according to claim 20, wherein one of the first switch circuit and the second switch circuit is only driven in a range of $0 \leq Da \leq 0.5$, where Da is a ratio of on time to a switching cycle thereof, and the other is only driven in a range of $0.5 \leq Da \leq 1$.

22. The isolated switching power supply apparatus according to claim 21, wherein, by letting a voltage conversion ratio which is represented by a ratio of the output voltage to an input voltage of the DC power input portion be M, and a ratio of a number of turns of the first primary winding to a number of turns of the first secondary winding be n, $M=D(1-D)/n$.

* * * * *